(12) United States Patent
Redmann et al.

(10) Patent No.: US 9,140,974 B2
(45) Date of Patent: Sep. 22, 2015

(54) METHOD AND SYSTEM FOR CROSSTALK AND DISTORTION CORRECTIONS FOR THREE-DIMENSIONAL (3D) PROJECTION

(75) Inventors: William Gibbens Redmann, Glendale, CA (US); Mark J. Huber, Burbank, CA (US); Joshua Pines, San Francisco, CA (US); Jed Harmsen, Los Angeles, CA (US)

(73) Assignee: Thomson Licensing, Issy les Moulineaux (FR)

( * ) Notice: Subject to any disclaimer, the term of this patent is extended or adjusted under 35 U.S.C. 154(b) by 620 days.

(21) Appl. No.: 12/806,445

(22) Filed: Aug. 12, 2010

(65) Prior Publication Data

US 2011/0038042 A1 Feb. 17, 2011

Related U.S. Application Data

(60) Provisional application No. 61/233,446, filed on Aug. 12, 2009, provisional application No. 61/261,736, filed on Nov. 16, 2009.

(51) Int. Cl.

| | |
|---|---|
| *G03B 21/00* | (2006.01) |
| *G03B 21/14* | (2006.01) |
| *G03B 35/18* | (2006.01) |
| *G03B 35/16* | (2006.01) |
| *H04N 13/04* | (2006.01) |
| *G02B 27/22* | (2006.01) |
| *H04N 13/00* | (2006.01) |

(52) U.S. Cl.
CPC ............... *G03B 35/18* (2013.01); *G02B 27/22* (2013.01); *G03B 21/00* (2013.01); *G03B 21/14* (2013.01); *H04N 13/00* (2013.01); *H04N 13/0434* (2013.01); *H04N 13/0459* (2013.01)

(58) Field of Classification Search
CPC ........ G03B 21/00; G03B 21/14; G03B 35/18; G02B 27/22; H04N 13/04; H04N 13/00; H04N 13/0003; H04N 13/0007
USPC ............... 353/7, 121, 69; 348/51; 352/60, 62; 359/462
See application file for complete search history.

(56) References Cited

U.S. PATENT DOCUMENTS

| | | | |
|---|---|---|---|
| 4,235,503 | A | 11/1980 | Condon |
| 4,464,028 | A | 8/1984 | Condon |

(Continued)

FOREIGN PATENT DOCUMENTS

| | | |
|---|---|---|
| CN | 1471792 A | 1/2004 |
| CN | 101014137 A | 8/2007 |

(Continued)

OTHER PUBLICATIONS

SkalA, "Cross-Talk Measurement for 3D Displays", IEEE. Proceedings ISBN 978-1-4244-4318-5, May 2009, pp. 1-4.

(Continued)

*Primary Examiner* — William C Dowling
*Assistant Examiner* — Magda Cruz
(74) *Attorney, Agent, or Firm* — Robert D. Shedd; Robert B. Levy; Lily Neff

(57) ABSTRACT

A method for use with 3-dimensional or stereoscopic projection is disclosed, with crosstalk and differential distortion compensations provided for stereoscopic images in a presentation such that the projected images will have reduced crosstalk and differential distortion.

23 Claims, 9 Drawing Sheets

(56) References Cited

U.S. PATENT DOCUMENTS

| | | |
|---|---|---|
| 4,999,668 A | 3/1991 | Suzuki et al. |
| 5,099,359 A | 3/1992 | Hrycin et al. |
| 5,119,189 A | 6/1992 | Iwamoto et al. |
| 5,121,983 A | 6/1992 | Lee |
| 5,255,083 A | 10/1993 | Capitant et al. |
| 5,481,321 A | 1/1996 | Lipton |
| 5,808,623 A | 9/1998 | Hamburg |
| 6,002,518 A | 12/1999 | Faris |
| 6,011,863 A | 1/2000 | Roy |
| 6,191,827 B1 | 2/2001 | Segman et al. |
| 6,361,171 B1 | 3/2002 | Ejiri et al. |
| 6,367,933 B1 | 4/2002 | Chen et al. |
| 6,433,840 B1 | 8/2002 | Poppleton |
| 6,491,400 B1 | 12/2002 | Chen et al. |
| 6,523,959 B2 | 2/2003 | Lee et al. |
| 6,530,665 B2 | 3/2003 | Takizawa et al. |
| 6,592,224 B2 | 7/2003 | Ito et al. |
| 6,609,797 B2 | 8/2003 | Ejiri et al. |
| 6,753,907 B1 | 6/2004 | Sukthankar et al. |
| 6,801,276 B1 | 10/2004 | Epstein et al. |
| 6,804,392 B1 | 10/2004 | Adams et al. |
| 6,804,406 B1 | 10/2004 | Chen |
| 6,932,479 B2 | 8/2005 | Kobayashi et al. |
| 6,939,011 B2 | 9/2005 | Kobayashi |
| 6,974,217 B2 | 12/2005 | Kimura et al. |
| 6,977,693 B2 | 12/2005 | Aronovitz |
| 6,997,563 B1 | 2/2006 | Wang et al. |
| 7,001,023 B2 | 2/2006 | Lee et al. |
| 7,014,323 B2 | 3/2006 | Kobayashi et al. |
| 7,073,911 B2 | 7/2006 | Yanagisawa |
| 7,140,736 B2 | 11/2006 | Kobayashi |
| 7,142,258 B2 | 11/2006 | Shin et al. |
| 7,144,115 B2 | 12/2006 | Li |
| 7,148,945 B2 | 12/2006 | Yanagisawa |
| 7,517,081 B2 | 4/2009 | Lipton et al. |
| 7,524,053 B2 | 4/2009 | Lipton |
| 7,944,481 B2 | 5/2011 | Kim et al. |
| 7,945,088 B2 | 5/2011 | Era |
| 8,144,188 B2 | 3/2012 | Facius et al. |
| 2001/0024231 A1 | 9/2001 | Nakamura et al. |
| 2002/0036819 A1 | 3/2002 | Watanabe |
| 2002/0122585 A1 | 9/2002 | Swift et al. |
| 2002/0135741 A1 | 9/2002 | Lee et al. |
| 2003/0043303 A1 | 3/2003 | Karuta et al. |
| 2003/0086051 A1 | 5/2003 | Chou et al. |
| 2004/0246390 A1 | 12/2004 | Yanagisawa |
| 2006/0181686 A1 | 8/2006 | Matsuda |
| 2006/0268104 A1 | 11/2006 | Cowan et al. |
| 2006/0291050 A1 | 12/2006 | Shestak et al. |
| 2007/0126986 A1 | 6/2007 | Yamazaki et al. |
| 2008/0204663 A1* | 8/2008 | Balogh ............................ 353/10 |
| 2008/0309884 A1* | 12/2008 | O'Dor et al. ...................... 353/7 |
| 2009/0128780 A1 | 5/2009 | Schuck et al. |
| 2009/0135365 A1 | 5/2009 | Dunn |
| 2009/0153649 A1 | 6/2009 | Hirooka et al. |
| 2009/0167639 A1 | 7/2009 | Casner et al. |
| 2011/0007278 A1 | 1/2011 | Huber et al. |
| 2011/0032340 A1 | 2/2011 | Redmann et al. |
| 2011/0080401 A1 | 4/2011 | Tan et al. |

FOREIGN PATENT DOCUMENTS

| | | |
|---|---|---|
| CN | 101015220 A | 8/2007 |
| CN | 101424863 A | 5/2009 |
| GB | 835705 | 5/1960 |
| JP | 04347994 | 12/1992 |
| JP | 2001054142 | 2/2001 |
| JP | 2001339742 A | 12/2001 |
| JP | 200361116 | 2/2003 |
| JP | 2005130360 A | 5/2005 |
| JP | 2006094458 | 4/2006 |
| JP | 2006133252 A | 5/2006 |
| JP | 2007534984 | 11/2007 |
| JP | 2008539675 | 11/2008 |
| WO | WO2006116536 | 11/2006 |
| WO | WO2009150529 | 12/2009 |

OTHER PUBLICATIONS

Boev et al., "Crosstaik Measurement Methodology for Auto-Stereoscopic Screens", Tampere University of Technology, Finland, Feb. 2007. pp. 1-4.

Kodak, "Kodak Telecine Tool Kit and Reference Manual", Kodak, Mar. 2003, pp. 1-40.

Huang et al., "Measurerment of Contrast Ratios for 3D Display", lnput/Output and Imaging Technologies II, Taiwan, Jul. 2000, pp. 78-86, Proceedings of SPIE vol. 4080.

Lacotte et al, "Elimination of Keystone and Crosstalk Effects in Stereoscopic Video", Rapport Technique De L'Inrs-Telecommunications, No. 95-31, Dec. 22, 1995, pp. 1-27.

Office Aciions for U.S. Appl. No. 12/803,857 mailed Jun. 18, 2012, Oct. 4, 2012, Jun. 20, 2013.

Office Actions for U.S. Appl. No. 12/846,676 mailed Nov. 28, 2012, Sep. 9, 2013.

Li et al., "Multi-Projector Tiled Display Wall Calibration with a Camera", Proceedings SPIE-IS&T Electronic Imaging, SPIE vol. 5668, p. 294-301, 2005.

A. J. Woods, "Understanding Crosstalk in Stereoscopic Displays" (Keynote Presentation) at 3DSA (Three-Dimensional Systems and Applications) conference, Tokyo, Japan, May 19-21, 2010.

A. J. Woods, "How are crosstalk and ghosting defined in the stereoscopic literature?" in Proceedings of SPIE Stereoscopic Displays and Applications XXII, vol. 7863, 78630Z (2011). Downloaded from: www.AndrewWoods3D.com.

Konrad et al., "Cancellation of Image Crosstalk in Time-Sequential Displays of Stereoscopic Video", IEEE Transactions on Image Processing, vol. 9, No. 5, May 2000.

Office Action for U.S. Appl. No. 12/803,657 mailed Jan. 31, 2014.

Office Action for U.S. Appl. No. 12/846,676 mailed Apr. 3, 2014.

Notice of Allowance for U.S. Appl. No. 12/803,657 mailed Jun. 9, 2014.

Notice of Allowance for U.S. Appl. No. 12/803,657 mailed Jan. 23, 2015.

Office Action for U.S. Appl. No. 12/846,676 mailed Mar. 20, 2015.

* cited by examiner

METHOD AND SYSTEM FOR CROSSTALK AND DISTORTION CORRECTIONS FOR THREE-DIMENSIONAL (3D) PROJECTION

CROSS-REFERENCE TO RELATED APPLICATIONS

This application claims priority to U.S. Provisional Application Ser. No. 61/233,446, "Method and System for Crosstalk and Distortion Corrections for Three-Dimensional (3D) Projection" filed on Aug. 12, 2009; and U.S. Provisional Application Ser. No. 61/261,736, "Method and System for Crosstalk and Distortion Corrections for Three-Dimensional (3D) Projection" filed on Nov. 16, 2009; both of which are herein incorporated by reference in their entirety.

This application also claims priority to commonly-assigned U.S. patent application Ser. No. 12/803,657, "Method and System for Differential Distortion Correction for Three-Dimensional (3D) Projection" filed on Jul. 1, 2010; and U.S. patent application Ser. No. 12/846,676, "Method for Crosstalk Correction for Three-Dimensional (3D) Projection" filed on Jul. 29, 2010; both of which are herein incorporated by reference in their entirety.

TECHNICAL FIELD

The present invention relates to a method for crosstalk and distortion corrections for use in three-dimensional (3D) projection and stereoscopic images with crosstalk and distortion compensations.

BACKGROUND

The current wave of 3-dimensional (3D) films is gaining popularity and made possible by the ease of use of 3D digital cinema projection systems. However, the rate of rollout of digital systems is not adequate to keep up with demand, partly because of the relatively high cost involved. Although earlier 3D film systems suffered from various technical difficulties, including mis-configuration, low brightness, and discoloration of the picture, they were considerably less expensive than the digital cinema approach. In the 1980's, a wave of 3D films were shown in the US and elsewhere, making use of a lens and filter designed and patented by Chris Condon (U.S. Pat. No. 4,464,028). Other improvements to Condon were proposed, such as by Lipton in U.S. Pat. No. 5,481,321. Subject matter in both references are herein incorporated by reference in their entirety.

Prior single-projector 3D film systems use a dual lens to simultaneously project left- and right-eye images laid out above and below each other on the same strip of film. These left- and right-eye images are separately encoded (e.g., by distinct polarization or chromatic filters) and projected together onto a screen and are viewed by an audience wearing filter glasses that act as decoders, such that the audience's left eye sees primarily the projected left-eye images, and the right eye sees primarily the projected right-eye images.

However, due to imperfection in one or more components in the projection and viewing system such as encoding filters, decoding filters, or the projection screen (e.g., a linear polarizer in a vertical orientation may pass a certain amount of horizontally polarized light, or a polarization-preserving screen may depolarize a small fraction of the incident light scattering from it), a certain amount of light for projecting right-eye images can become visible to the audience's left eye, and similarly, a certain amount of light used for projecting left-eye images can become visible to the audience's right eye, resulting in crosstalk.

In general, "crosstalk" refers to the phenomenon or behavior of light leakage in a stereoscopic projection system, resulting in a projected image being visible to the wrong eye. Other terminologies used to describe various crosstalk-related parameters include, for example, "crosstalk percentage", which denotes a measurable quantity relating to the light leakage, e.g., expressed as a percentage or fraction, from one eye's image to the other eye's image and which is a characteristic of a display or projection system; and "crosstalk value", which refers to an amount of crosstalk expressed in an appropriate brightness-related unit, which is an instance of crosstalk specific to a pair of images displayed by a system. Any crosstalk-related parameters can generally be considered crosstalk information.

The binocular disparities that are characteristic of stereoscopic imagery put objects to be viewed by the left- and right-eyes at horizontally different locations on the screen (and the degree of horizontal separation determines the perception of distance). The effect of crosstalk, when combined with a binocular disparity, results in each eye seeing a bright image of an object in the correct location on the screen, and a dim image (or dimmer than the other image) of the same object at a slightly offset position, resulting in a visual "echo" or "ghost" of the bright image.

Furthermore, these prior art "over-and-under" 3D projection systems exhibit a differential keystoning distortion between the projected left- and right-eye images, i.e., the projected left- and right-eye images have different keystoning distortions, in which each projected image has a magnification that varies across the image such that a rectangular shape is projected as a keystone shape. Furthermore, the left- and right-eye images have different magnifications at the same region of the screen, which is especially apparent at the top and bottom of the screen. This further modifies the positions of the crosstalking images, beyond merely the binocular disparity.

Differential keystoning arises because the 'over' lens (typically used for projecting the right-eye image), is located higher above the bottom of the screen than is the 'under' lens (used for projecting the left-eye image) and thus, has a greater throw or distance to the bottom of the screen. This results in the right-eye image having a greater magnification towards the bottom of the screen than the left-eye image. Similarly, the left-eye image (projected through the 'under' lens) undergoes greater magnification at the top of the screen than does the right-eye image.

This differential keystoning produces two detrimental effects for 3D projection using the dual-lens configuration. First, in the top-left region of the screen, the greater-magnified left-eye image appears more to the left than the lesser-magnified right-eye image. This corresponds in 3D to objects in the image being farther away. The opposite takes place in the top-right region, where the greater-magnified left-eye image appears more to the right and, since the audience's eyes are more converged as a result, the objects there appear nearer. For similar reasons, the bottom-left region of the screen displays objects closer than desired, and the bottom-right region displays objects farther away than desired. The overall depth distortion is rather potato-chip-like, or saddle shaped, with one pair of opposite corners seeming to be farther away, and the other pair seeming nearer.

Second, differential keystoning causes a vertical misalignment between the left- and right-eye images near the top and bottom of the screen. This misalignment can cause fatigue when viewed for a long time, and detracts from some individuals' ability to comfortably and quickly fuse 3D objects imaged there.

Not only is the combined effect distracting to audiences, but it can also cause eye-strain, and detracts from the 3D presentation.

In digital cinema presentations, Matt Cowan teaches, in US published application 2006/268,104A1, a technique of crosstalk correction that subtracts from the image for one eye a fraction of the image for the other eye, in which the fraction corresponds to the expected crosstalk. This works in digital cinema (and video) or projection systems that do not have differential keystone distortion, e.g., systems that multiplex the left- and right-eye images in the time domain so that the left- and right-eye images are projected from the same physical images along the same optical axis such that the two images overlay each other precisely. However, this approach is inadequate for stereoscopic film projection systems, dual-projector systems or single-projector over-and-under systems that exhibit differential keystone distortion.

Furthermore, application of the Cowan technique to a 3D film can degrade the image, because edges of objects subject to crosstalk compensation are effectively sharpened. This occurs because when a compensation is made for a crosstalk that actually occurs at a different location (e.g., due to uncompensated differential distortion), instead of a decreased brightness at the proper location suffering from the crosstalk, a nearby location or pixel has its brightness decreased while the crosstalk remains unaddressed. Thus, instead of merely suffering from uncompensated crosstalk, the result is an artificially dark line near the uncorrected bright line, to produce a visually intensified edge. Thus, a different crosstalk compensation technique is needed in the presence of differential distortion.

BRIEF DESCRIPTION OF THE DRAWINGS

The teachings of the present invention can be readily understood by considering the following detailed description in conjunction with the accompanying drawings, in which:

FIG. 7b illustrates a variation of the method in FIG. 7a; and

To facilitate understanding, identical reference numerals have been used, where possible, to designate identical elements that are common to the figures. The drawings are not to scale, and one or more features may be expanded or reduced for clarity.

SUMMARY OF THE INVENTION

One aspect of the present invention relates to a method for providing crosstalk and differential distortion compensations for a plurality of stereoscopic image pairs for use with a stereoscopic projection system. The method includes (a) determining a distortion compensation transform based on at least one differential distortion associated with projection of a first and second images of a stereoscopic image pair, (b) applying crosstalk compensation to the plurality of stereoscopic image pairs in accordance with an uncertainty associated with a residual differential distortion, and a crosstalk percentage for a region in projected image space, and (c) applying the distortion compensation transform to the plurality of crosstalk-compensated stereoscopic image pairs to produce a stereoscopic presentation containing the plurality of crosstalk-compensated image pairs with differential distortion corrections.

Another aspect of the present invention relates to a method for providing crosstalk and differential distortion compensations in stereoscopic image pairs for use with a stereoscopic projection system. The method includes (a) determining a distortion compensation transform based on at least one differential distortion associated with projection of a first and second images of a first stereoscopic image pair, (b) applying at least one crosstalk compensation to the first stereoscopic image pair in accordance with an uncertainty associated with a residual differential distortion, and a crosstalk percentage for a region in projected image space, and (c) applying the distortion compensation transform to the first crosstalk-compensated stereoscopic image pair to produce a second stereoscopic image pair with crosstalk and differential distortion corrections.

Yet another aspect of the present invention relates to a plurality of stereoscopic images for use in a stereoscopic projection system. The plurality of images includes a first set of images and a second set of images, each image from one of the two sets of images forming a stereoscopic image pair with an associated image from the other of the two sets of images, in which at least some images in the first and second sets of images incorporate compensations for differential distortion and crosstalk, and the crosstalk compensation is determined based in part on an uncertainty associated with a residual differential distortion.

DETAILED DESCRIPTION

The present invention relates to a method that characterizes and compensates for the crosstalk and differential distortion, for a projection system. The method provides distortion compensation to a film or digital image file to at least partially mitigate the effect of the differential distortion, e.g., keystoning, with crosstalk compensation that takes into account the presences of residual differential distortions, i.e., if the differential distortion has not be completely corrected for.

Figure 1:
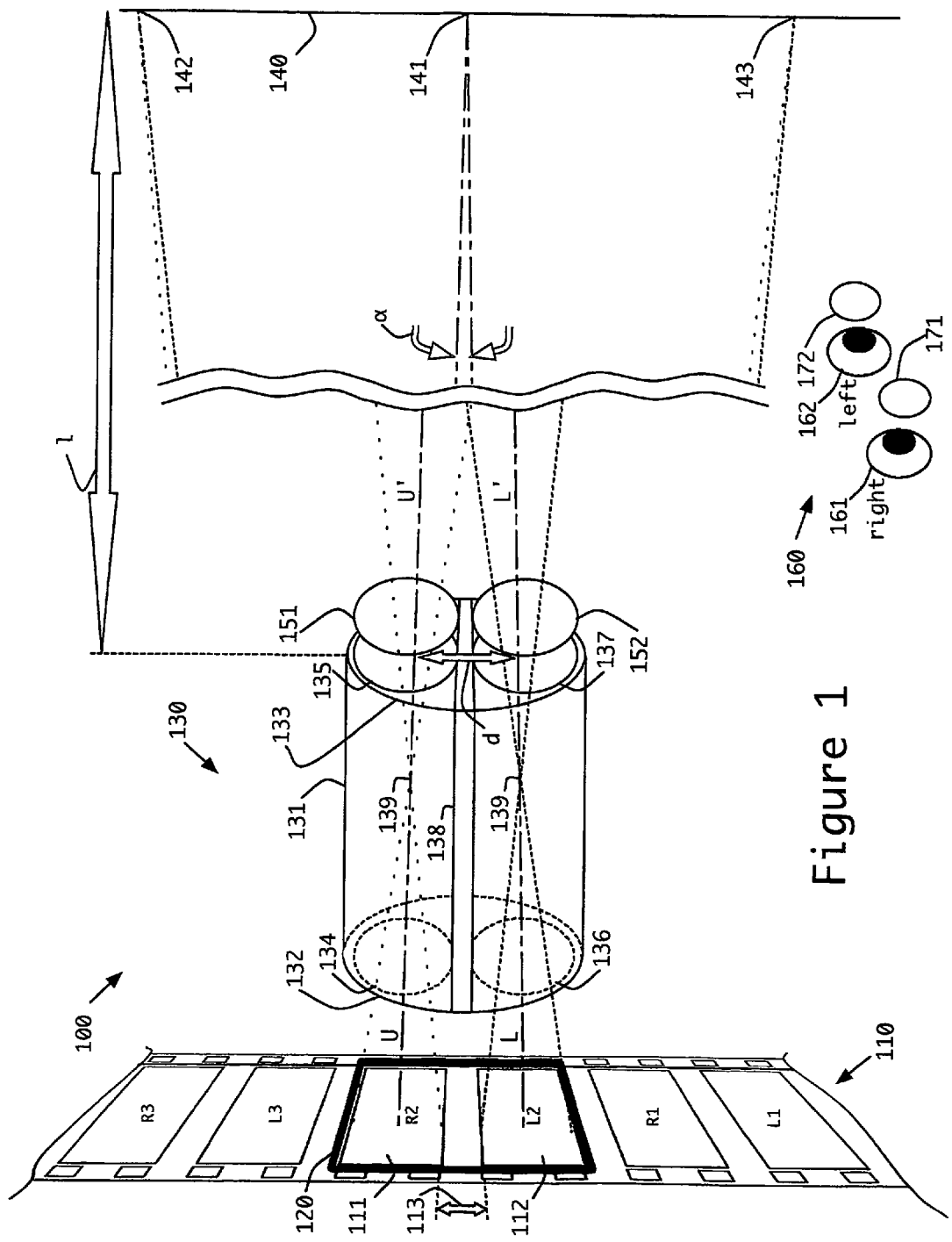
FIG. 1 illustrates a stereoscopic film projection system using a dual (over-and-under) lens.

FIG. 1 shows an over/under lens 3D or stereoscopic film projection system 100, also called a dual-lens 3D film projection system. Rectangular left-eye image 112 and rectangular right-eye image 111, both on over/under 3D film 110, are simultaneously illuminated by a light source and condenser optics (collectively called the "illuminator", not shown) located behind the film while framed by aperture plate 120 (of which only the inner edge of the aperture is illustrated, for clarity) such that all other images on film 110 are not visible since they are covered by the portion of the aperture plate which is opaque. The left- and right-eye images (forming a stereoscopic image pair) visible through aperture plate 120 are projected by over/under lens system 130 onto screen 140, generally aligned and superimposed such that the tops of both projected images are aligned at the top edge 142 of the screen viewing area, and the bottoms of the projected images are aligned at the bottom edge 143 of the screen viewing area.

Over/under lens system 130 includes body 131, entrance end 132, and exit end 133. The upper and lower halves of lens system 130, which can be referred to as two lens assemblies, are separated by septum 138, which prevents stray light from crossing between the two lens assemblies. The upper lens assembly, typically associated with right-eye images (i.e., used for projecting right-eye images such as image 111), has entrance lens 134 and exit lens 135. The lower lens assembly, typically associated with left-eye images (i.e., used for projecting left-eye images such as image 112), has entrance lens 136 and exit lens 137. Aperture stops 139 internal to each half of dual lens system 130 are shown, but for clarity's sake other internal lens elements are not. Additional external lens elements, e.g., a magnifier following the exit end of dual lens 130, may also be added when appropriate to the proper adjustment of the projection system 100, but are also not shown in FIG. 1. Projection screen 140 has viewing area center point 141 at which the projected images of the two film images 111 and 112 should be centered.

The left- and right-eye images 112 and 111 are projected through left- and right-eye encoding filters 152 and 151 (may also be referred to as projection filters), respectively. To view the stereoscopic images, an audience member 160 wears a pair of glasses with appropriate decoding or viewing filters or shutters such that the audience's right eye 161 is looking through right-eye decoding filter 171, and the left eye 162 is looking through left-eye decoding filter 172. Left-eye encoding filter 152 and left-eye decoding filter 172 are selected and oriented to allow the left eye 162 to see only the projected left-eye images on screen 140, but not the projected right-eye images. Similarly, right-eye encoding filter 151 and right-eye decoding filter 171 are selected and oriented to allow right eye 161 to see only the projected right-eye images on screen 140, but not left-eye images.

Examples of filters suitable for this purpose include linear polarizers, circular polarizers, anaglyphic (e.g., red and blue), and interlaced interference comb filters, among others. Active shutter glasses, e.g., using liquid crystal display (LCD) shutters to alternate between blocking the left or right eye in synchrony with a similarly-timed shutter operating to extinguish the projection of the corresponding film image, are also feasible.

Unfortunately, due to physical or performance-related limitations of filters 151, 152, 171, 172, and in some cases, screen 140 and the geometry of projection system 100, a non-zero amount of crosstalk can exist, in which the projected left-eye images are slightly visible, i.e., faintly or at a relatively low intensity, to the right-eye 161 and the projected right-eye images are slightly visible to the left-eye 162.

This crosstalk, also known as leakage, results in a slight double image for some of the objects in the projected image. This double image is at best distracting and at worst can inhibit the perception of 3D. Its elimination is therefore desirable.

In one embodiment, the filters 151 and 152 are linear polarizers, e.g., an absorbing linear polarizer 151 having vertical orientation placed after exit lens 135, and an absorbing linear polarizer 152 having horizontal orientation placed after exit lens 137. Screen 140 is a polarization preserving projection screen, e.g., a silver screen. Audience's viewing glasses includes a right-eye viewing filter 171 that is a linear polarizer with a vertical axis of polarization, and a left-eye viewing filter 172 that is a linear polarizer with a horizontal axis of polarization (i.e., each viewing filter or polarizer in the glasses has the same polarization orientation as its corresponding filter or polarizer 151 or 152 associated with the respective stereoscopic image). Thus, the right-eye image 111 projected through the top half of dual lens 130 becomes vertically polarized after passing through filter 151, and the vertical polarization is preserved as the projected image is reflected by screen 140. Since the vertically-polarized viewing filter 171 has the same polarization as the projection filter 151 for the right-eye image, the projected right-eye image 111 can be seen by the audience's right-eye 161. However, the projected right-eye image 111 would be substantially blocked by the horizontally-polarized left-eye filter 172 so that the audience's left-eye 162 would not see the projected right-eye image 111. Unfortunately, the performance characteristics of such filters are not always ideal, and crosstalk can result from their non-ideal characteristics.

In this example, the crosstalk percentage (leakage) of the projected right-eye image into the left-eye 162 of audience member 160 is a function of three first-order factors: first, the amount by which right-eye encoding filter 151 transmits horizontally polarized light (where filter 151 is oriented to transmit primarily vertically polarized light); second, the degree to which screen 140 fails to preserve the polarization of light it reflects; and third, the amount by which left-eye decoding filter 172 transmits vertically polarized light used for projecting right-eye images (where filter 172 is oriented to transmit primarily horizontally polarized light).

These factors are measurable physical values or quantities that affect the entire image equally. However, there are variations that can be measured across the screen (e.g., the degree to which polarization is maintained may vary with angle of incidence or viewing angle, or both), or at different wavelengths (e.g., a polarizer may exhibit more transmission of the undesired polarization in the blue portion of the spectrum than in the red). Since the crosstalk arises from one or more components of the projection system, it can be referred to as being associated with the projection system, or with the projection of stereoscopic images.

In some present-day stereoscopic digital projection systems (not shown), pixels of a projected left-eye image are precisely aligned with pixels of a projected right-eye image because both projected images are being formed on the same digital imager, which is time-domain multiplexed between the left- and right-eye images at a rate sufficiently fast as to minimize the perception of flicker. It is known that crosstalk of a first image into a second image can be compensated by reducing the luminance of a pixel in the second image by the expected crosstalk from the same pixel in the first image (see Cowan, op.cit.). When the crosstalk occurs with the expected value, the amount of light leaking in from the projected wrong eye image (e.g., first image) restores substantially the amount of luminance by which the projected corrected eye image (e.g., second image) has been reduced. It is further known that this correction can vary chromatically (e.g., to correct a case where the projector's blue primary exhibits a different amount of crosstalk than green or red) or spatially (e.g., to correct a case where the center of the screen exhibits less crosstalk than the edges). However, these known crosstalk correction methods assume perfect registration between the projected pixels of the left- and right-eye images, which is inadequate for other projection systems such as those addressed in the present invention for which differential distortion is present. In fact, under certain circumstances, applying the known crosstalk correction method to projected stereoscopic images without taking into account the image misalignment arising from differential distortion can exacerbate the adverse effects of crosstalk by making them more visible.

Figure 2:
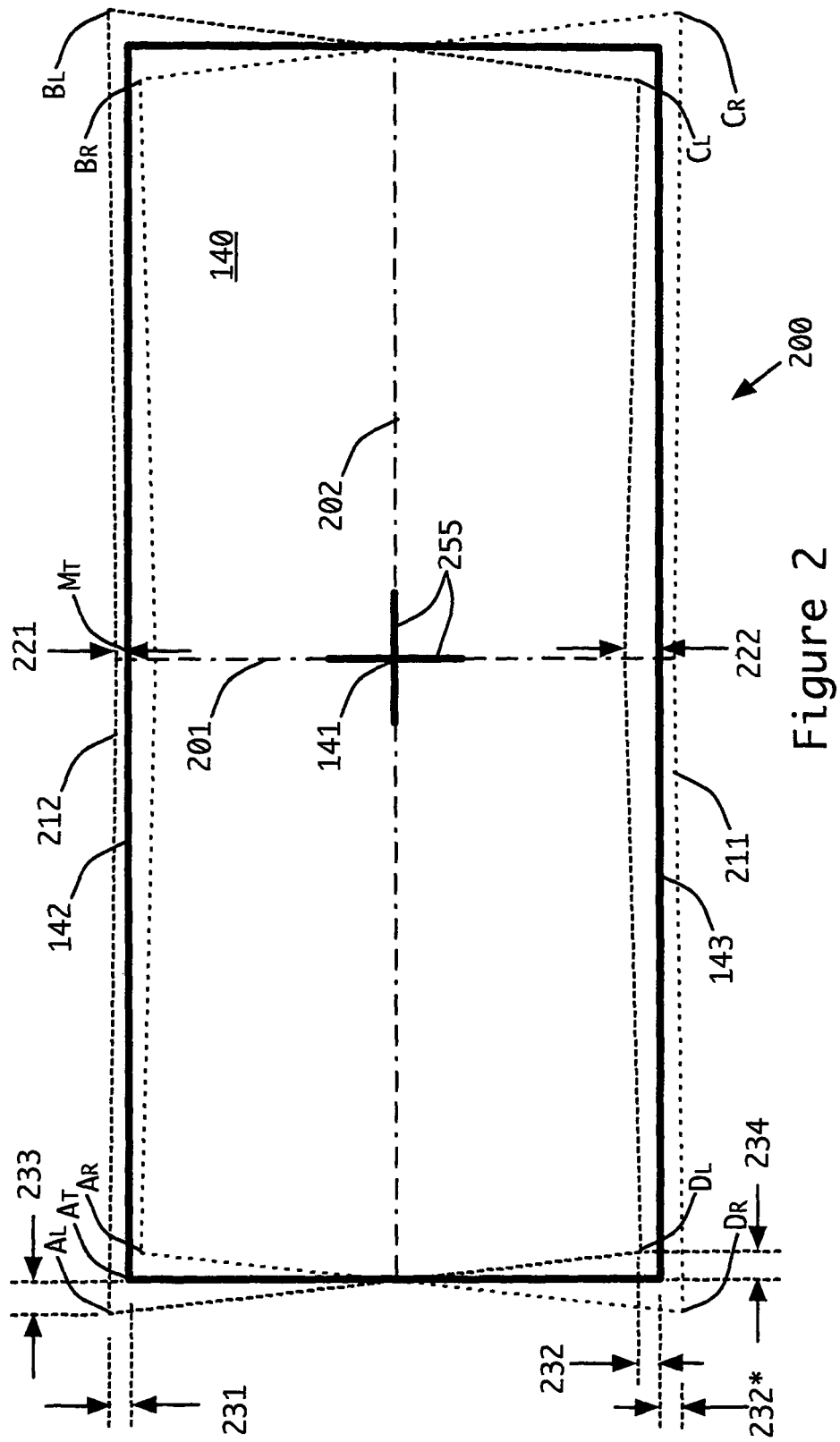
FIG. 2 illustrates the differential distortions to left- and right-eye images projected with the stereoscopic film projection system of FIG. 1.

Referring now to FIG. 2, a projected presentation 200 is shown at the viewing portion of projection screen 140, having center point 141, vertical centerline 201, horizontal centerline 202. When properly aligned, the left- and right-eye projected images are horizontally centered about vertical centerline 201 and vertically centered about horizontal centerline 202. The tops of the projected left- and right-eye images are close to the top 142 of the visible screen area, and the bottoms of the projected images are close to the bottom 143 of the visible screen area. In this situation, the boundaries of the resulting projected left- and right-eye image images 112 and 111 are substantially left-eye projected image boundary 212 and right-eye projected image boundary 211, respectively (shown in FIG. 2 with exaggerated differential distortion, for clarity of the following discussion).

Due to the nature of lens 130, the images 111 and 112 are inverted when projected onto screen 140. Thus, the bottom 112B of left-eye image 112 (close to the center of the opening in aperture plate 120) is projected toward the bottom edge 143 of the visible portion of projection screen 140. Similarly, the top 111T of right-eye image 111 (close to the center of the opening in aperture plate 120) is projected toward the top edge 142 of the visible portion of screen 140. On the other hand, the top 112T of left-eye image 112 is projected near the top edge 142, and the bottom 111B of right-eye image 111 is projected near the bottom edge 143 of the visible portion of projection screen 140.

Also shown in FIG. 2 is the presence of differential distortion, i.e., different geometric distortions between the two projected right-eye and left-eye images. The differential distortion arises from differing projection geometries for the right- and left-eye images. In this example, the projected right-eye image is represented by a slightly distorted quadrilateral with boundary 211 and corners $A_R$, $B_R$, $C_R$ and $D_R$; and the left-eye image is represented by a slightly distorted quadrilateral with boundary 212 and corners $A_L$, $B_L$, $C_L$ and $D_L$.

The right-eye image boundary 211 and left-eye image boundary 212 are illustrative of a system alignment in which differential keystone distortions of the projected stereoscopic images are horizontally symmetrical about vertical centerline 201 and the differential keystone distortions of the left-eye are vertically symmetrical with those of the right-eye about horizontal centerline 202. The keystoning distortions result primarily because right-eye image 111 is projected by the top half of dual lens 130, which is located further away from the bottom edge 143 of the viewing area (or projected image area) than the lower half of dual lens 130. The slightly increased distance for the top half of lens 130 to the screen compared with the lower half of lens 130 results in a slight increase in magnification for the projected right-eye image compared to the left-eye image, as evident by a longer bottom edge $D_R C_R$ of projected right-eye image 211 compared to the bottom edge $D_L C_L$ of the projected left-eye image 212. On the other hand, the top half of dual lens 130 is closer to the top edge 142 of the viewing area than the lower half of lens 130. Thus, the top edge $A_R B_R$ of projected right-eye image 211 is shorter than the top edge $A_L B_L$ of the projected left-eye image 212.

Near the top-left corner of screen 140, left-eye projected image boundary 212 has horizontal magnification keystone error 233 (representing horizontal distance between corner $A_L$ and corner A, which is where $A_L$ would be in the absence of keystone distortion) and vertical magnification keystone error 231. When symmetrically aligned, similar errors are found at the top-right corner of screen 140. Near the bottom-left corner of screen 140, left-eye projected image boundary 212 has horizontal demagnification keystone error 234, and vertical demagnification keystone error 232.

Besides differential keystoning, additional differential distortions may be present, for example a differential pincushion distortion, where vertical magnification error 221 at the center-top of projected right-eye image 212 with respect to the top 142 of screen 140 may not be the same as vertical magnification error 231 in the corner. Similarly, vertical demagnification error 222 at the center-bottom of projected right-eye image 212 may not be the same as vertical demagnification error 232. (In this example, additional horizontal distortions are not shown, for brevity.) Field curvature induced pincushion or barrel distortion may be corrected by the present invention, whether substantially different between the projected left- and right-eye images or not. If there is no substantial difference in the pin cushion or barrel distortion between the left- and right-eye images, the field curvature can be corrected for in identical manner for both left- and right-eye images. However, if the pin cushion or barrel distortions are different between the left- and right-eye images, then different corrections will be needed for the two images. In other embodiments, corrections for differential pincushion and/or barrel distortions may be omitted, e.g., if it is decided that these differential distortions are negligible or can be ignored.

Figure 3A:
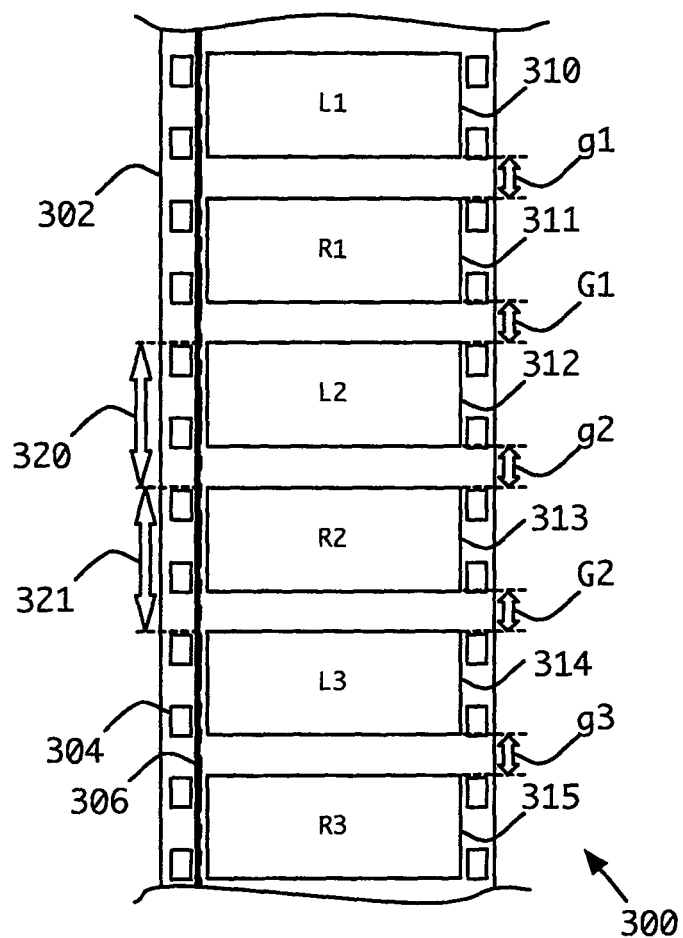
FIG. 3a illustrates a segment of a 3D film suitable for use in the projection system of FIG. 1.

FIG. 3a shows an over/under 3D film 300, e.g., an original film without corrections for geometric distortions from projection systems. Film stock 302 has regularly spaced stereoscopic image pairs, e.g., first pair of left- and right-eye images 310 and 311, second pair 312 and 313, and third pair 314 and 315 (labeled as L1, R1, L2, R2, L3 and R3, respectively), as well as sprocket holes 304 along both edges, and optical sound track 306, which may be digital.

The original images 310-315 are arranged to have a constant intra-frame gap "g", i.e., the distance or gap between the left- and right-eye images of a stereoscopic image pair is the same for each image pair (e.g., g1=g2=g3), as well as a constant inter-frame gap "G", i.e., the distance or gap between the right-eye image of one stereoscopic pair and the left-eye image of the next or adjacent stereoscopic pair is the same for each adjacent pair (e.g., G1=G2). Accordingly, the distance 320 between the tops of images (e.g., L2, R2) in a pair is the same for all pairs, as is the distance 321 between the tops of adjacent images (e.g., R2 and L3) in adjacent pairs. The sum of distance 320 and 321 is the frame length, which is typically the same for a given projector, whether projecting in 2D or 3D. In this example, the frame length corresponds to four perforations (also known as 4-perf) of standard 35 mm film.

Figure 4:
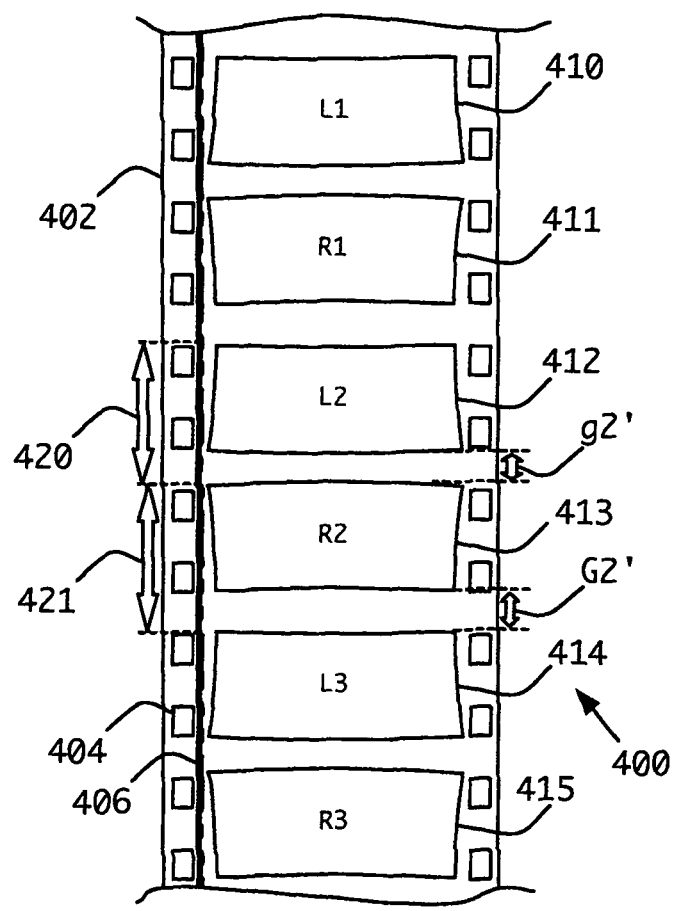
FIG. 4 illustrates a segment of a distortion-corrected 3D film of the present invention, suitable for use in the projection system of FIG. 1.

FIG. 4 illustrates an over/under 3D film 400 according to one embodiment of the present invention, with respective left- and right-eye images 410-415 having been modified from corresponding original images 310-315 of 3D film 300. Specifically, images 410-415 are modified to correct for geometric distortions such that the projected left- and right-images will substantially overlap each other (e.g., right-eye image 211 and left-eye image 212 in FIG. 2 will overlap). Film stock 402 also has sprocket holes 404 and sound track 406 similar to those on 3D film 300.

In the example of FIG. 4, each left- and right-eye image of 3D film 400 has been warped or modified so as to substantially correct the differential keystone errors and field curvature induced distortions shown in FIG. 2. A discussion of computational methods suitable to achieving such a warp is taught by George Wolberg in "Digital Image Warping", published by the IEEE Computer Society Press, Los Alamitos, Calif. 1990. For simple warps to correct keystoning only, the algorithm taught by Hamburg in U.S. Pat. No. 5,808,623 may be used. Subject matter in both references is herein incorporated by reference in their entireties.

As a result of the warping that produces images 410-415, the intra-frame distance g2' on film 400 may not equal intra-frame distance g2 on film 300. Similarly, inter-frame distance G2' on film 400 may not equal inter-frame distance G2 on film 300. Likewise the distance 420 between the tops of images in a pair may not equal corresponding distance 320; and the distance 421 between the tops of adjacent images in adjacent pairs may not equal corresponding distance 321. However, the sum of distances 420 and 421, i.e., the frame length, is the same as the sum of distances 320 and 321, thus allowing a direct replacement of distortion corrected 3D film 400 for prior art 3D film 300. In general, distance 420 may be the same as or different from distance 421, and distance 440 may be the same as or different from distance 441.

As shown by Wolberg, many different algorithms can achieve the warping of images 310-315 to produce warped images 410-415. Perhaps the easiest is a perspective warp that employs empirical measurements of the distortions as shown in FIG. 2 and discussed in one branch of the flowchart of FIG. 6.

In the present invention, prior to applying the warp shown in FIG. 4 and recording the images 410-415 to film, a crosstalk compensation is applied to pixels of each of the left- and right-eye images in each stereoscopic pair.

Figure 5:
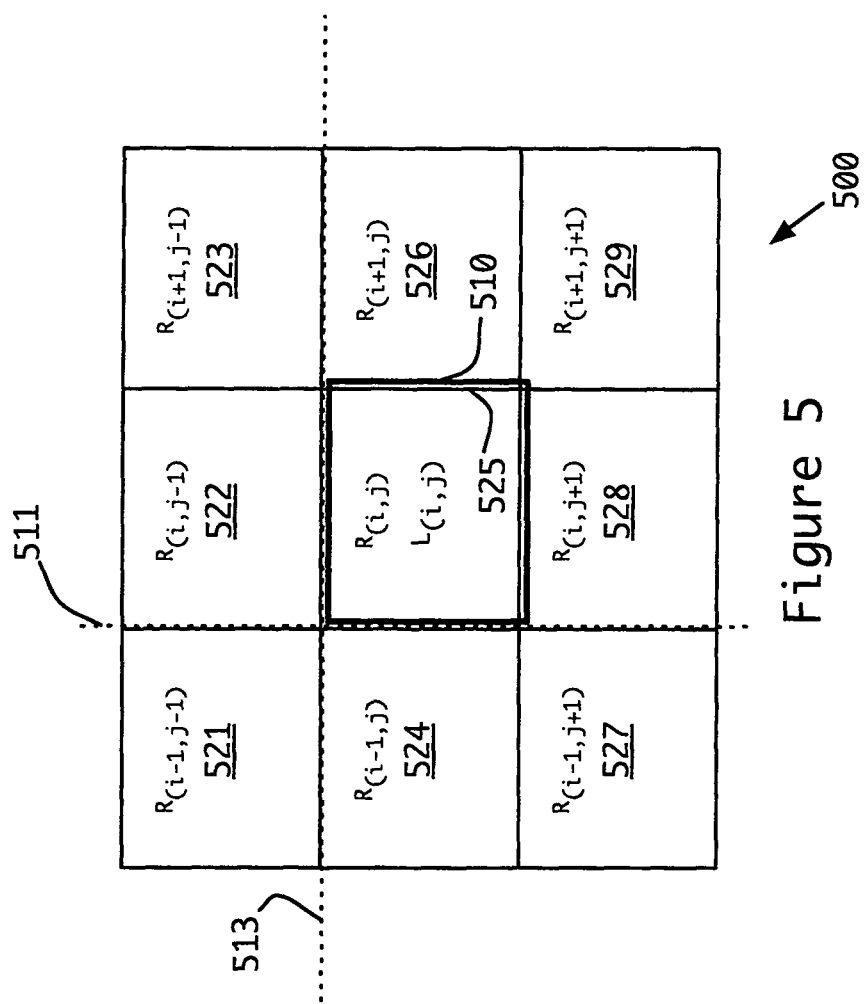
FIG. 5 illustrates a spatial relationship between a projected pixel from a first image of a stereoscopic pair and proximate pixels from a second image of the stereoscopic pair that may contribute to crosstalk at the pixel of the first image.

The spatial relationship among pixels of one image that contribute crosstalk to a given pixel of the other image is illustrated in FIG. 5, which shows a region 500 of an overlaid stereoscopic image pair around a left-eye image pixel 510 (shown as a rectangle in bold) and surrounding pixels from the right-eye image that may contribute to the crosstalk value at the pixel 510. Note that the pixels in FIG. 5 refer to those in the original images, before any distortion correction. The presumption is that the projection of film 400 (i.e., after distortion compensation) will result in right- and left-eye images in each stereoscopic image pair that substantially overlap each other. Thus, performing the crosstalk correction between the original images is a valid approach, since it is known or expected that the distortion compensation will substantially correct for the differential distortion in the projection. To the extent that the differential distortion is not completely corrected for (e.g., resulting in residual differential distortion), any additional crosstalk contributions can be addressed based on the uncertainty related to the distortion compensation, as will be discussed below.

Left-eye image pixel 510 has coordinate $\{i,j\}$, and is designated $L(i,j)$. Right-eye pixel 525, with coordinate designation $R(i,j)$, is the pixel in the right-eye image that corresponds to the left-eye pixel 510, i.e., the two pixels should overlap each other in the absence of differential distortion. Other pixels in region 500 include right-eye image pixels 521-529 within the neighborhood of, or proximate to, pixel 510. Left-eye pixel 510 is bounded on the left by grid line 511, and at the top by grid line 513. For this example, grid lines 511 and 513 may be considered to have the coordinate values of i and j, respectively, and the upper-left corner of left-eye pixel 510 is thus designated as $L(i,j)$. Note that grid lines 511 and 513 are straight, orthogonal lines and represent the coordinate system in which the left- and right-eye images exist. Although pixels 510 and 525 and lines 511 and 513 are meant to be precisely aligned to each other in this example, they are shown with a slight offset to clearly illustrate the respective pixels and lines.

Right-eye pixels 521-529 have top-left corners designated as $\{i-1, j-1\}$, $\{i, j-1\}$, $\{i+1, j-1\}$, $\{i-1, j\}$, $\{i, j\}$, $\{i+1, j\}$, $\{i-1, j+1\}$, $\{i, j+1\}$, and $\{i+1, j+1\}$, respectively. However, if projected without geometric compensation, as in film 300, the images of left-eye pixel 510 and corresponding right-eye pixel 525 may not be aligned, or even overlap due to the differential geometric distortions. Even with the application of an appropriate image warp to provide the geometric compensation of film 400, there remains an uncertainty, e.g., expressed as a standard deviation, as to how well that warp will produce alignment, either due to uncertainty in the distortion measurements of a single projection system 100, or due to variations among multiple theatres. Specifically, the uncertainty refers to the remainder (or difference) between the actual differential distortion and the differential distortion for which compensation is provided (assuming that the compensation is modeling some measure of the actual distortion) to the film, e.g., film 400, when the compensation is obtained based on a measurement performed in one lens system, or based on an average distortion determined from measurements in different lens systems. Sources of this uncertainty include: 1) imprecision in the measurements, e.g., simple error, or rounding to the nearest pixel; 2) statistical variance when multiple theatres are averaged together, or 3) both.

Due to the uncertainty in the alignment provided by the distortion correction warp, there is an expected non-negligible contribution to the crosstalk value of the projection of left-eye pixel 510 from right-eye pixels 521-529, which are up to 1 pixel away from pixel 510 (this example assumes an uncertainty in the alignment or distortion compensation of up to about 0.33 pixels and a Gaussian distribution for the distortion measurements). However, if the uncertainty exceeds 0.33 pixels, then additional pixels (not shown) that are farther away than pixels 521-529 may also have non-negligible crosstalk contributions.

While right-eye image pixel 525 will have the greatest expected contribution to the crosstalk value at the projection of left-eye image pixel 510, neighboring or proximate pixels 521-524 and 526-529 may have non-zero expected contributions. Furthermore, depending on the magnitude of the uncertainty for the alignment at any given pixel, additional surrounding right-eye image pixels (not shown) may also have a non-negligible expected crosstalk contribution. In one embodiment of the present invention, when determining the contributions by pixels of the right-eye image to the crosstalk value at the projected left-eye image pixel 510, this uncertainty in the distortion correction of an image is addressed. In one example, a Gaussian blur is used to generate a blurred image, which takes into account the uncertainty in the locations of the pixels in a first eye's image (arising from uncertainty in the distortion measurements or correction) that are expected to contribute to the crosstalk value of a pixel in the other eye's image. Thus, instead of using the actual value of right-eye image pixel 525 in calculating the crosstalk value, the value for pixel 525 is provided by using a blurred or a lowpass filtered version (Gaussian blur is a lowpass filter) of the right-eye image. In this context, the value of the pixel refers to a representation of one or more of a pixel's properties, which can be, for example, brightness or luminance, and perhaps color. The calculation of crosstalk value at a given pixel will be further discussed in a later section.

Note that the converse is also true. When considering the crosstalk contributions from the projection of the left-eye image at the projection of the right-eye image pixel 525, a lowpass filtered version of the left-eye image is used to provide a "blurred" pixel value of pixel 510 for use in crosstalk calculations in lieu of the actual value of pixel 510.

The behavior of the lowpass filter, or the amount of blur, should be proportional to amount of the uncertainty, i.e., greater uncertainty suggesting a greater blur. In one method, for example, as known to one skilled in the art, a Gaussian blur can be applied to an image by building a convolution matrix from values of a Gaussian distribution, and applying the matrix to the image. In this example, the coefficients for the matrix would be determined by the magnitude of the uncertainty expressed as the standard deviation 6 (sigma) of the residual error after the geometric distortion compensation has been imposed, in accordance with the following formula.

$$G_{circular}(x, y) = \frac{1}{2\pi\sigma^2} e^{-\frac{x^2+y^2}{2\sigma^2}} \qquad \text{EQ. 1}$$

In this equation, the coordinates {x,y} represent the offsets in the convolution matrix being computed, and should be symmetrically extended in each axis in both the plus and minus directions about zero by at least 3σ (three times the magnitude of the uncertainty) to obtain an appropriate matrix. Once the convolution matrix is built and normalized (the sum of the coefficients should be unity), a lowpass-filtered value is determined for any of the other-eye image pixels by applying the convolution matrix such that the filtered value is a weighted sum of that other-eye image pixel's neighborhood, with that other-eye image pixel contributing the heaviest weight (since the center value in the convolution matrix, corresponding to {x,y}={0,0} in EQ. 1, will always be the largest). As explained below, this lowpass-filtered value for the pixel will be used for calculating a crosstalk contribution from that pixel. If the values of other-eye image pixels represent logarithmic values, they must first be converted into a linear representation before this operation is performed. Once a lowpass-filtered value is determined for an other-eye pixel, the value is available for use in the computation of the crosstalk value in step 609 of the process described below, and is used in lieu of the other-eye's pixel value in that computation.

In one embodiment, the uncertainty may be determined at various points throughout screen 140, such that the standard deviation is known as a function of the image coordinate system, e.g., σ(i,j). For instance, if the residual geometric distortion is measured at or estimated for the center and each corner over many screens, σ can be calculated separately for the center and each corner and then σ(i,j) represented as an interpolation among these.

In another embodiment, the expected deviation of the residual geometric distortions may be recorded separately in the horizontal and vertical directions, such that the uncertainty σ(i,j) is a vector with distinct horizontal and vertical uncertainties, $\sigma_h$ and $\sigma_v$ which can be used to model an elliptical uncertainty, by calculating the coefficients of the convolution matrix as in EQ. 2.

$$G_{elliptical}(x, y) = \frac{1}{2\pi\sigma_h\sigma_v} e^{-\left[\frac{x^2}{2\sigma_h^2} + \frac{y^2}{2\sigma_v^2}\right]} \qquad \text{EQ. 2}$$

In still another embodiment, the elliptical nature may further include an angular value by which the elliptical uncertainty is rotated, for example if the uncertainty in the residual geometric distortions were found to be radially oriented.

Figure 6:
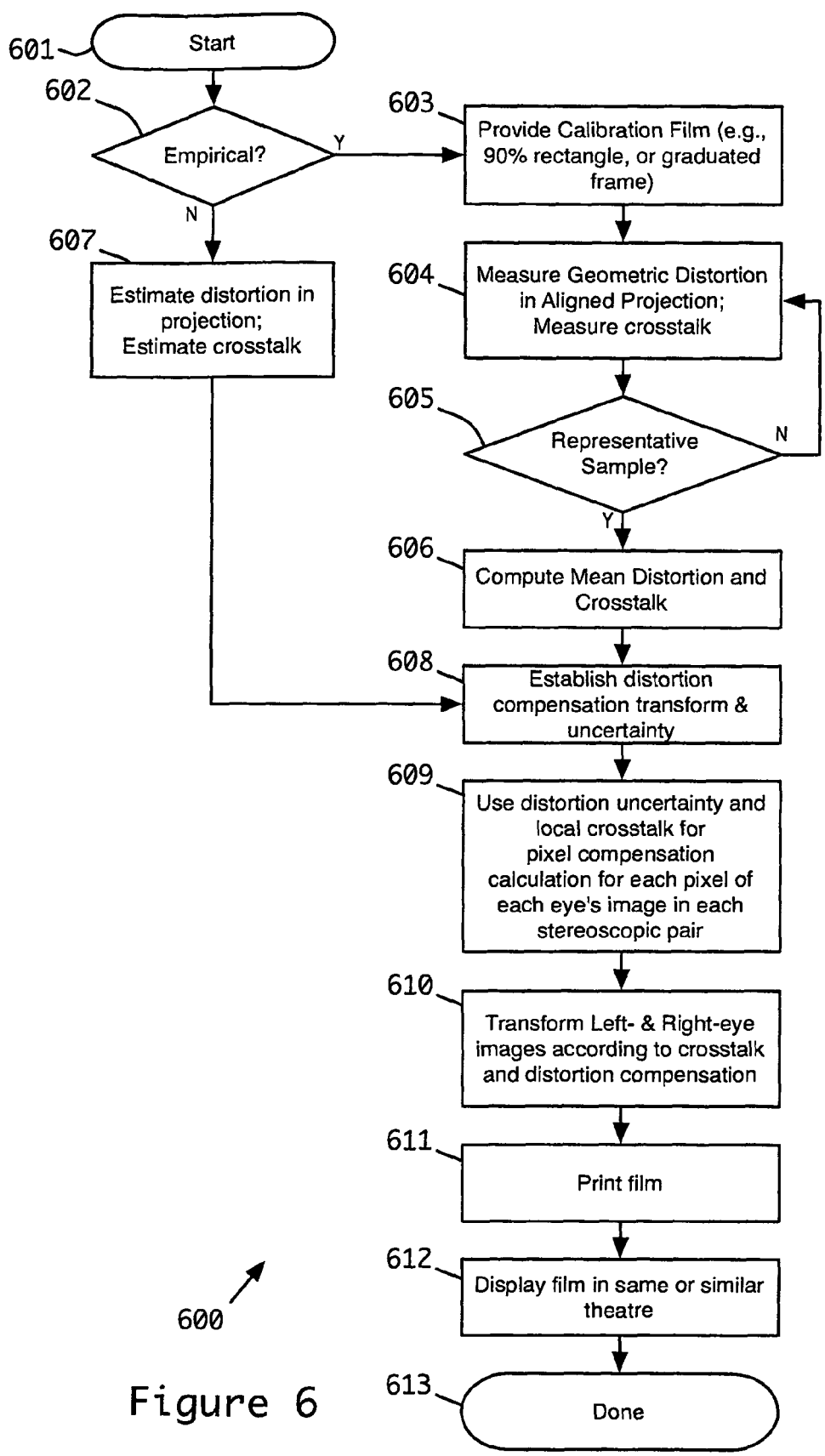
FIG. 6 illustrates a method suitable for compensating for differential distortions and crosstalk in stereoscopic film projection.

FIG. 6 shows a process 600 suitable for stereoscopic distortion correction and crosstalk correction according to one embodiment of the present principles, which can be used to produce a film, e.g., film 400, which is compensated for both expected distortions and expected crosstalk values for the pixels. The expected distortions and crosstalk refer to the distortions and crosstalk values that one would observe between the left- and right-eye images of a stereoscopic pair when projected in a given projection system. Process 600 begins at step 601 in which the film format (e.g., aspect ratio, image size, etc.) is established, and the theatre in which the resulting film is to be projected, e.g., using a dual-lens projection system such as system 100 or a dual-projector system, is selected. If the film is being prepared for a number of theatres with similar projection systems, then these theatres can be identified or representative ones chosen for the purpose of distortion and crosstalk determination, as explained below.

In step 602, a decision is made as to whether the differential keystone and/or field curvature distortions and crosstalk are to be corrected using empirical approaches (e.g., by direct measurements), or by theoretical computations. Even though FIG. 6 shows that both distortion and crosstalk are estimated in step 607 or measured in step 604, in other embodiments, one can also select a non-empirical approach for one parameter while an empirical approach is used for the other, e.g., calculate distortion in step 607, and measure crosstalks in step 604.

Step 607

If theoretical computation is selected, then method 600 proceeds to step 607 for the estimation or calculation of the distortion(s) and crosstalk in the projected images.

The differential distortion calculation takes into account various parameters and geometries of the projection system, e.g., system 100 of FIG. 1. For example, when computing differential distortion, a shorter throw 'l' and a constant inter-lens distance 'd' (and thus, a larger convergence angle α) will result in a larger differential distortion compared with a configuration with a larger throw 'l', where the convergence angle 'α' is computed from the following equation:

$$\alpha = 2\tan^{-1}\left(\frac{d}{l}\right) \qquad \text{EQ. 3}$$

The geometric calculation of differential distortions may be aided by computer aided design or lens selection software for theatres, such as "Theater Design Pro 3.2", version 3.20.01, distributed by Schneider Optics, Inc., of Hauppauge, N.Y., which computes the width of the top and bottom of a projected image and other parameters for a theatre of specified dimensions. By computationally displacing the virtual projector vertically by inter-lens distance the resulting computed dimensions can be noted, along with those of the undisplaced virtual projector. Since convergence angle 'α' is relatively small, changes in most of the trigonometric relationships used to determine the projection dimensions will be substantially linear for modest adjustments of 'd'. Thus, for cases where the value displayed by a program (e.g., in Theater Design Pro, the value of Width (Top) in the Image Details report) does not change with a displacement by 'd', a larger value (e.g., 10 times 'd') can be used, and the change in the reported value scaled down by the same factor.

For an over/under lens, or a lens arrangement with non-identical projection geometries for the stereoscopic image pair, there are almost always some differential distortions. Thus, it is generally preferable to apply at least some distortion corrections, even if relatively small, than not applying any correction at all. For example, a correction of 1 pixel, or about 0.001 inch or smaller, may be used as an estimate, and produce better results than making no correction at all.

Based on the calculated or estimated distortion(s), one or more differential distortions may be determined for use in a compensation transform in step 608 to implement corrections to these distortions. The differential distortions may be expressed in different manners. In one example, it may be given by the respective offsets of two corresponding points in the right- and left-eye images from a target position on the screen. Thus, if a target position is the top-left corner of the visible region of the screen 140, the differential distortions may be specified by the number of pixels (horizontally and vertically) that the corners $A_L$ and $A_R$ deviate from that corner position (e.g., to compensate for the differential distortions, $A_L$ might need to move down 2.5 and rightward 3.2 pixels, and $A_R$ might need to move up 2.0 and leftward 1.1 pixels).

Alternatively, the differential distortion may also be expressed as the distance from $A_L$ to $A_R$, in which case, the distortion compensation may entail moving each of $A_L$ and $A_R$ halfway towards each other, so that they overlap each other, though not necessarily at a predetermined, specific location on the screen.

In the crosstalk estimation or calculation portion of step 607, the crosstalk percentage may be estimated from the specifications of the materials or components (e.g., filters and screen). For example, if right-eye filter 151 is known to pass 95% of vertically polarized light and 2% of horizontally polarized light, that would represent about 2.1% (0.02/0.95) leakage into the left-eye 162. If screen 140 is a silver screen and preserves polarization on 94% of reflected light, but disrupts polarization for the remaining 5%, that would represent an additional 5.3% (=0.05/0.94) of leakage into either eye. If left-eye horizontal polarizing filter 172 passes 95% of horizontally polarized light, but allows 2% of vertically polarized light to pass, then that is another 2.1% of leakage. Together, these different leakage contributions will add (in the first order) to about 9.5% of leakage resulting in an overall crosstalk percentage, i.e., the fraction of light from the right-eye image observed by the left-eye.

$$\frac{0.02}{0.95} + \frac{0.05}{0.94} + \frac{0.02}{0.95} = 0.0953 \qquad \text{CALC 1}$$

If a higher accuracy is required, a more detailed, higher-order calculation can be used, which takes into account the light leakage or polarization change at each element in the optical path, e.g., passage of the wrong polarization through a polarizing filter element or polarization change by the screen. In one example, a complete higher-order calculation of the crosstalk percentage from the right-eye image to the left-eye image can be represented by:

$$\frac{(0.95*0.94*0.02) + (0.95*0.05*0.95) + (0.02*0.94*0.95) + (0.02*0.05*0.02)}{(0.95*0.94*0.95) + (0.95*0.05*0.02) + (0.02*0.94*0.02) + (0.02*0.05*0.95)} = 9.484\% \qquad \text{CALC 2}$$

In the above expression, each term enclosed in parentheses in the numerator represents a leakage term or leakage contribution to an incorrect image (i.e., light from a first image of the stereoscopic pair passing through the viewing filter of the second image, and being seen by the wrong eye) arising from an element in the optical path, e.g., projection filters, screen and viewing filters. Each term enclosed in parentheses in the denominator represents a leakage that actually contributes light to the correct image.

In this context, each leakage refers to each time that light associated with a stereoscopic image is transmitted or reflected with an "incorrect" (or un-intended) polarization orientation due to a non-ideal performance characteristic of an element (e.g., a filter designed to be a vertical polarizer passing a small amount of horizontally polarized light, or a polarization-preserving screen resulting in a small amount of polarization change).

In the above expression of CALC2, terms representing an odd number of leaks (one or three) appear in the numerator as leakage contributions, whereas terms containing an even number of 'leaks' (zero or two) appear in the denominator as contributing to the correct image. The latter contribution to the correct image can arise, for example, when a fraction of incorrectly polarized light (e.g., passed by an imperfect polarizing filter) changes polarization upon being reflected off the screen (which should have preserved polarization), and results in the leakage being viewed by the correct eye.

For example, the third term in the numerator of CALC2 represents the fraction of the leakage caused by right-eye image projection filter 151 (2%) remains unchanged by screen 140 (94%) and passed by left-eye viewing filter 172 (95%). The fourth term in the denominator represents light leakage contribution to the correct image when horizontally-polarized light leaked by filter 151 has its polarization changed by screen 140 back to vertical polarization, thus resulting in leakages contributing to the correct image when passed by vertical polarizing filter 171.

However, the more detailed calculation of CALC2 usually results in a value only slightly different than the simpler estimate from the first order calculation (CALC1), and thus, the simpler calculation is adequate in most cases.

The estimation of crosstalk percentage, whether uniform across screen 140 or different by region of screen 140 or by color primary, is used in the pixel compensation calculation of step 609.

Steps 603-606

If an empirical method is selected in step 602, then a calibration film is produced (or otherwise made available or provided) in step 603, which will be used in subsequent steps for characterizing one or more distortions for producing distortion-corrected images. In one example, the calibration film resembles uncorrected 3D film 300, with image aspect ratios and size appropriate to the film format established or selected in start step 601. For example, the calibration film may be provided as a loop of film having a number of left- and right-eye images, similar to those shown in the uncorrected film 300. One or more of the left-images may be the same (e.g., L1 being the same as L2 and/or L3) and one or more of the right-images may be the same (e.g., R1 being the same as R2 and/or R3).

Figure 3B:
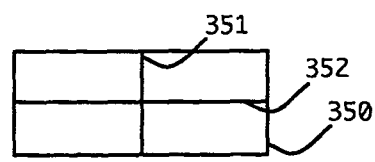
FIG. 3b illustrates a test image pattern in a calibration film suitable for use in one embodiment of the present invention.

In one embodiment, each left- and right-eye image for the calibration film comprises a test pattern, e.g., a rectangular border that is similar to the edge or rectangular border of each left- and right-eye image 310-315 of FIG. 3*a*. One example of a test pattern 350 is shown in FIG. 3*b*. The borders of test pattern 350 may have dimensions that are the same as or close to those of the rectangular borders of images in FIG. 3*a*. By providing the test pattern 350 to be smaller than images on film 300 (e.g., each border of pattern 350 lying inside images L1, R1, . . . ), one can avoid the border being cut off by aperture plate 120 of FIG. 1 or by the edges of screen 140 when projected. Furthermore, each calibration image or test pattern can have vertical and horizontal centerlines 351 and 352, respectively, as shown in FIG. 3b. Alternatively, instead of the centerlines spanning the entire lengths of the image, a cross-hair may be provided at the center of the image (as an example, a cross-hair projection 255 is shown in FIG. 2).

With 3D projection system 100 properly and symmetrically aligned, this embodiment of the calibration film will produce projected left- and right-eye images similar to those shown in FIG. 2, where the rectangle corresponding to the edge of the left-eye image 312 will produce keystoned boundary 212, and the rectangle corresponding to the edge of the right-eye image 313 will produce the keystoned boundary 211. The vertical and horizontal centerlines (or cross-hair) of the test pattern or calibration image will produce projected vertical and horizontal centerlines that coincide with the centerlines 201 and 202 of the viewing area, respectively, as shown by the crosshair 255 at the center 141 of screen 140 as shown in FIG. 2.

Step 604—Distortion and Crosstalk Measurements

In step 604, both distortion and crosstalk measurements are performed. The calibration film from step 603 is projected and the 3D projection system 100 is aligned such that the center of the left- and right-eye image is projected at the center 141 of screen 140 and both images appear coincident and level with respect to the horizontal centerline. One or more of the keystoning, pin cushion or barrel distortions (generally referred to as geometric distortions) can be measured from the projected images. Note that for every point on the screen, there are two distortions: one for the left-eye, and one for the right-eye. In general, more than one type of distortions may exist in the projected images. However, one can still perform measurements or obtain information directed towards a specific type of distortion by selecting appropriate measurement locations such as corners or edges of a projected image that are relevant to the distortion of interest. Although keystoning distortion is used to illustrate the method of the present principles, it is understood that the measurement and compensation procedures also apply to other types of distortion.

In the embodiment of the calibration film (FIG. 3b), if borders of the test pattern have a known physical or logical width, i.e., if the lines forming the rectangles are known to be 0.001 inches (physical) or in a digital film recorder the lines are known to be one-pixel wide (logical), then the keystone errors 231-234 can be measured in "line-widths" and then converted to these physical or logical units. (The line-width refers to the actual width of the line, as projected on the screen. Thus, if the lines in the image are one pixel wide, but on the screen are 0.75 inches wide, then 0.75 inches will constitute one line-width, which can be used as a unit for measuring or estimating distances on the screen.) For example, if the horizontal distance magnification error 233 appears to be about three line-widths, then the value of offset 233 can be noted as 0.003 inches (or three pixels) by relying upon the known width of the lines forming border 212. Another measure of the differential keystone error would be the horizontal distance between the top-left corner ($A_L$) of left-eye image border 212 and the top-left corner ($A_R$) of right-eye image border 211, which, in a symmetrical setup, would equal the sum of distance 233 and distance 234.

In general, the "differential keystone error" can be defined as a difference between the locations of two points in the projected right- and left-images, respectively, which, in the absence of keystoning effects in both images, would have appeared at the same location on the screen.

Such empirical measurements can be made for each corner of the respective left- and right-eye images, regardless of whether the projection geometry is symmetrical or not (if the projection geometry is asymmetrical, the right- and left-eye images have different magnitudes of various distortions). Furthermore, the pin cushion or barrel distortions can be measured, e.g., by comparing distances 221, 222 with distances 231, 232, which are indicative of curvatures in the top edges of projected left-eye border 212. Similar measurements can also be made for other edges, e.g., $A_L D_L$ or $B_L C_L$, that may exhibit such distortions.

In the above embodiment, measurements are performed at separate corner and edge points for each of the left- and right-eye images (an edge point refers to a point along an edge of a projected image where measurement can be performed, e.g., distance 221 is one measurement taken at an edge point $M_T$). However, for each point where distortion measurement is done for the left-eye, the right-eye image is likely to have a corresponding distortion.

In an alternative embodiment, each of the left- and right-eye images in the calibration film includes a graduated grid (not shown), which acts as a coordinate system for the screen. At selected points on the screen 140, coordinates can be taken from each of the projected left- and right-eye grids. The reading of these coordinates can be aided by the left-eye grid being in one color (e.g., green) and the right-eye grid being in another color (e.g., red). Alternatively, the left- and right-eye grids can be projected separately, e.g., by covering exit lens 135 (in the lens assembly for right-eye images) while making measurements for the left-eye, and covering exit lens 137 (in the lens assembly for left-eye images) while measuring the right-eye image. Using a graduated grid can provide an advantage if screen 140 is non-planar, e.g., a cylindrical screen, or toroidal screen, where differential distortions may not be adequately defined by measurements only at corner or edge points of the projected image. In general, any frame in a film with a variety of image patterns can be used as calibration film, as long as the pattern includes discernible reference points or edges to allow measurement of the specific distortion of interest.

It is previously mentioned that images on the calibration film may be the same left- and right-image pairs, e.g., L1 being the same as L2 and L3; and R1 being the same as R2 and R3. However, in another embodiment, images on the calibration film may be provided as an animated sequence, e.g., left-images L1, L2 and L3 are different from each other, and right-images R1, R2 and R3 are different from each other. The different images in such an animated sequence may be designed, in conjunction with narrative from a sound track, to provide instructions regarding the calibration procedure, and to facilitate the performance of distortion measurements.

Thus, the calibration film may have left- and right-images with different test patterns (e.g., rectangular boundaries with different dimensions or corner locations) such that, when projected, will provide left- and right-images that exhibit different distorted image points due to differential distortions. For example, one image pair may have a larger separation between their top-left corners (e.g., $A_R$ and $A_L$ in FIG. 2) due to keystoning, while other image pairs may show smaller separations between these corresponding corners. As the image pairs on the calibration film are projected, the image pair that produces respective corners that overlap each other (or exhibit the smallest separation) may then be recorded, e.g., by an operator or automatically via software. Individual image pairs may be identified by providing a counter or identifying mark on the images of the calibration film. By noting the image pair that produces the smallest differential distortion, corresponding correction parameters for certain distortions may be derived from the relevant dimensions of the pattern in the image pair. Aside from corners, edge points or sides of a pattern may also be used for deriving corresponding correction parameters.

In another embodiment, the images in the calibration film may also be designed such that one series of images, e.g., the right-images are identical to each other (e.g., a single rectangle), while the left-images are provided as a series of "graduated" rectangles with different dimensions, e.g., different % of the right-image dimensions. The calibration procedure may then involve identifying the left-image that has certain point or element (e.g., corners or edge points, sides, etc.) that intersects or substantially coincides with the corresponding point of the right-image. In this context, identifying the image may be considered performing a measurement. Such a calibration film may be useful in configurations where a certain distortion, e.g., keystoning, affects only one of the stereoscopic images.

In step 604, the amount of crosstalk for each stereoscopic image is also determined, e.g., by direct measurement or empirical observation. For example, the crosstalk, expressed as a percentage or ratio of two measurements, expected for left- and right-eye images of a stereoscopic pair projected by the system in the selected theatre can be directly measured or estimated at one or more regions of a screen (corresponding to projected image space). If the crosstalk is expected or known not to vary significantly across the projection screen, then crosstalk determination at one region would be sufficient. Otherwise, such determination will be done for additional regions. What is considered as a significant variation will depend on the specific performance requirement based on business decision or policy.

In one embodiment, the crosstalk percentage is measured by determining the amount of a stereoscopic image (i.e., the light for projecting the image) that leaks through a glasses' viewing filter for the other stereoscopic image. This can be done, for example, by running a blank (transparent) film through projection system 100, blocking one output lens, e.g. covering left-eye output lens 137 with an opaque material, and measuring the amount of light at a first location or region of the screen 140, e.g., center 141, as seen from the position of audience member 160 through the right-eye filter 171. This first measurement can be referred to as the bright image measurement. Although an open frame (i.e., no film) can be used instead of a transparent film, it is not preferred because certain filter components, e.g., polarizers, may be vulnerable to high illumination or radiant flux. A similar measurement, also with the left-eye output still blocked, is performed through the left-eye filter 172, and can be referred to as the dim image measurement.

These two measurements may be made with a spot photometer directed at point 141 through each of filters 171 and 172. A typical measurement field of about one or two degrees can be achieved. For these measurements, the respective filters 171 and 172, each being used separately in the respective measurements, should be aligned along the optical axis of the photometer, and positioned with respect to the photometer in similar spatial relationship as between the viewing glass filters and the audience's right- and left-eyes 161 and 162. The ratio of the dim image measurement to the bright image measurement is the leakage, or crosstalk percentage. Optionally, additional measurements can be done at other audience locations, and the results (the ratios obtained) of a specific screen region can be averaged (weighted average, if needed).

If desired, similar measurements may be made for other locations or regions on the screen by directing the photometer at those points. As will be discussed below, these measurements for different screen locations can be used for determining crosstalk values associated with pixels in different regions of the screen. Further, if the photometer has spectral sensitivity, i.e., capable of measuring brightness as a function of wavelength, the crosstalk can be assessed for discoloration (e.g., whether the crosstalk is higher in the blue portion of the spectrum than in the green or red) so that a separate-crosstalk percentage may be determined for each color dye in the print film.

In still another embodiment, the crosstalk percentage may be directly observed, for example, by providing respective test content or patterns for the left- and right-eye images. For example, a pattern having a density gradient (not shown) with values ranging from 0% transparency to 20% transparency (i.e., from maximum density up to at least the worst-expected-case for crosstalk, which may be different from 20% in other examples) can be provided in the left-eye image 112, and a pattern (not shown) in the right-eye image 111 is provided at 100% transparency, i.e., minimum density. To determine the crosstalk percentage from the right-eye image to the left-eye image, an observer could visually determine, by looking at the test content only with left-eye 162 through the left-eye filter 172, which gradient value best matches the apparent intensity of right-eye pattern leaking through the left-eye filter 172.

The left-eye pattern may be a solid or checkerboard pattern projected at the top half of the screen, with a density gradient that provides a 0% transparency (i.e., black) on the left, to 20% transparency on the right (e.g., with black squares in the checkerboard always black, but the 'bright' or non-black squares ranging from 0% to 20% transparency). The right-eye pattern may also be a solid or checkerboard pattern projected at the lower half of the screen (e.g., with bright squares of the checkerboard being at a minimum density, i.e., full, 100% brightness). The observer, viewing through the left-eye filter only, may note where, from left to right, the pattern across of the top of the screen (i.e., left-eye image) matches intensity with the pattern at the bottom of the screen (i.e., right-eye image), that is, where the leakage of the bottom pattern best matches the gradient at the top of the screen.

Using separate color test patterns, a separate crosstalk percentage may be obtained for each of the cyan, yellow, and magenta dyes of print film 110.

From the foregoing, other techniques for measuring, calculating, or estimating the amount of crosstalk will be apparent to those skilled in the art.

Steps 605-606

When measurements in step 604 are complete, an evaluation is made in step 605 as to whether the measurements from step 604 constitute a representative sample. If, for example, a distortion corrected film 400 is being made for precisely one theatre in which the distortions were performed in step 604, then the measurements may be used exactly as noted. If, however, the measurements were made in one theatre or display venue (i.e., one projection system and configuration) are used for a distortion corrected film 400 to be distributed to numerous theatres with different projection systems and/or configurations, then a more appropriate or larger sample size should be collected, e.g., by returning (repeatedly as needed) to measurement step 604 for additional measurements in other theatres or display venues.

Once a sufficient number of measurements have been collected from different projection systems and/or theatres, the measured results are consolidated in step 606, for example, by computing a mean or average value using suitable techniques, which can include arithmetic or geometric mean, or least squares mean, among others.

If one or more projection systems have much more severe keystoning effects (or other distortions) than most of the other systems, then the averaging approach may result in a distortion that is significantly skewed, or inappropriate for other systems. In this situation, the outlier(s) should be discarded based on certain criteria, and not be used in calculating the mean distortions.

If crosstalk measurements are performed in multiple theatres or projection systems, an average crosstalk value will also be calculated in step 606 for use in step 609 below. Furthermore, it is possible that the crosstalk can be estimated (as in step 607) but the distortion measured (as in step 604). In other words, step 602 can be separately decided for each of crosstalk and distortion.

Step 608

In step 608, a differential distortion compensation transform can be established or determined for left- and right-images based on the keystone distortions established at each corner of the left- and right-eye calibration or test images of a stereoscopic image pair. In addition, the uncertainty associated with the remaining distortion after compensation transform is also determined in this step. The compensation transform in this step addresses only the image distortions (not the crosstalk compensation), and will be used in a subsequent step to transform image data from an original 3D film (i.e., uncorrected for any distortion) to image data that is partially corrected for at least one type of distortion associated with a projection system.

Different approaches can be used for establishing the compensation transform, one of which is the use of warp algorithms with associated image warp targets as parameters. For instance, if measurements from step(s) 604 show that the top-left corner ($A_L$) of the left-eye image is too far to the left by three pixels and too high by two pixels, then an image warp target can be set so that a compensation transform moves the top-left corners of all left-eye images down by two pixels and right by three (i.e., with a magnitude about equal to, but in a direction opposite to the measured distortion), and so on for all four corners of each of the left- and right-eye images. Typically, an image warp target is set for each individual measurement point, such as the corners. These four targets, when applied to the respective images, will correct for keystone distortions. That is, each "target" represents an image shift (e.g., in vertical and horizontal steps), or a correction factor or parameter, that can be applied to correct for the corresponding distortion at a specific point of the image. These image warp targets are used as basis for the compensation transform, i.e., transformation function that can be applied to an image.

In other words, based on measurements performed at specific points of a test image (e.g., corresponding to corners $A_L$, $A_R$, or edge points of FIG. 2), correction parameters can be derived. The measurements may include corner locations, or a difference in corner locations. Applying these correction parameters to an original film image will result in a distortion-corrected image, which when projected, will have corners appearing at desired target locations. For example, after applying proper corrections for keystone distortions, corners $A_L$ and $A_R$ will both appear at a target location such as the corner $A_T$ of the viewing area.

Referring to FIG. 2, if the top edge $A_L B_L$ of left-eye test image is curved (as opposed to a straight line), the difference between the expected straight-line height (e.g., distance 231) and the actual height as measured at midpoint $M_T$ along the vertical centerline 201 (e.g., distance 221) can also be included to set a warp target for the middle of the top edge (point $M_T$) to be lowered by a certain amount. Similar correction targets can be established for the middle of each edge of a given image. These targets will correct for pin cushion or barrel distortions.

The compensation transform can be established in step 608 based on the warp targets defined appropriately for any chosen warp algorithm (e.g. Hamburg, op. cit.), or based on distortions determined by computation or estimate in step 607. A warp algorithm takes parameters (e.g., a 2D offset for each corner of a rectangle) and a source image, to produce the warped image. With appropriately selected parameters, the resulting warped image has a built-in compensation for the distortions resulting from the projection geometries. Thus, in one example, the compensation transform (or "image warp") can be a warp algorithm with chose parameters applied to each stereoscopic image pair such as [310, 311], [312, 313], and [314, 315] to produce the corresponding pairs of distortion-compensated images [410, 411], [412, 413], and [414, 415]. This correction is applied consistently throughout the entire film in step 610 (to be further discussed below). Depending on the specific measurements performed, the compensation transform may include one or more corrections for the distortions for which measurements are done.

Two options are available regarding a distortion compensation transform: one can use a single compensation transform for transforming both left- and right-eye images of a stereoscopic pair, or two separate transforms can be used for transforming respective left- and right-eye images.

When only a single transformation function is used, the transformation or warp function needs to include sufficient parameters to provide corrections to one or both images of a stereoscopic pair. Furthermore, since there is no image in the intra-frame gap (e.g., g1-g3), if a single transformation is used to warp both the right- and left-eye images at the same time, the transformation also needs to incorporate any "sign changes" associated with the warp directions for the upper and lower images (e.g., if one image is being warped upwards but the other is being warped downwards). In other words, the corrections to the distortions of the left- and right-eye images are permitted to be discontinuous somewhere within the intra-frame gap 'g'. Furthermore, if the transformation or correction is provided as a continuous function, there should be suitable isolation so that alterations in the warp for one eye's image would not affect the warp of the other eye (except where symmetry warrants this). This correction is applied consistently throughout the entire film in step 610 (to be further discussed below).

Depending on the specific measurements performed, the compensation transform may include one or more corrections for the different types of distortions (e.g., keystoning, pin cushion or barrel) for which measurements are done. It is not necessary that compensation transform be used to correct all the known or measured distortions. For example, it is possible to correct only one type of distortions, and if further improvement is desired, another compensation transform can be applied to correct for other types of distortion.

Note that the compensation transform may also result in changes to the intra-frame gap (e.g., g2') in the corrected film. Referring to the example in FIG. 2, in order to compensate for the differential distortion, the bottom-left corner $D_L$ of left-eye image should move down by a distance 232 and the top-left corner $A_R$ of right-eye image should move up by a distance 232* (not necessarily equal to distance 232). Similarly, corner $C_L$ and $B_R$ for the left- and right-images should be moved accordingly. Thus, it is clear that the intra-frame gap g2' of corrected film 400 would be smaller than distance g2 of the original film, because of the reduced distance between the new positions for corners $C_L$, $D_L$ of left-eye image and corners $A_R$, $B_R$ of right-eye image.

In an alternative embodiment, the transformation of left- and right-eye images in step 608 may be conducted separately, i.e., a first transformation used for the left-eye image, and a second transformation used for the right-eye image. In other words, the compensation transform does not have to be a single transform handling both the left- and right-eye pair in the entirety of the frame (as bounded, for example, by aperture plate 120, or as measured by the 4-perf frame spacing). Care must be taken that the corrections to the distortions of the left- and right-eye images do not overlap, e.g., causing intra-frame gap g2' or inter-frame gap G2 to be reduced passed zero.

Although FIG. 6 shows that the compensation transform can be established based on distortions obtained by two different approaches (computed or measured), it is also possible that the distortion values be provided by a combination of both approaches, e.g., one type of distortion arrived at by computation, and another type of distortion being measured.

In step 608, the uncertainty associated with any residual distortion is also determined. Based on the selected compensation transformation(s) (e.g., determined based on keystone distortion measurements), the expected deviation from the measured distortion data (step 604) or estimated distortion (step 607) can be calculated. In one example, the uncertainty can be calculated based on the standard deviation between the actual distortion of multiple key points (e.g., the center, midpoints, and corners) and the correction provided by the distortion compensation transform. In another example, an average of the magnitudes of the residual distortions for a give point of the images can also be used as the uncertainty. For instance, if the distortion compensation transform moves a specific original pixel (e.g., the one associated with the top-left corner $A_L$) to a specific new position, then the standard deviation of all the samples used to evaluate the distortion can be computed relative to the new position, using an appropriate formula for the standard deviation known to one skilled in the art, for example, the square root of the mean of the squares of the residual distortion at the top-left corner, after accounting for the moved pixel. Note that this uncertainty or standard deviation may apply to measurement samples from different theatres. If it is known that certain regions are not well compensated by the distortion compensation transform (e.g., in the vicinity of $M_T$), such regions should also be used in the calculation of uncertainty.

Alternatively, one may consider the distortion compensation to be highly accurate, in which case, a standard deviation for the data used in the calculations in step 606 can be used as an estimate of the uncertainty.

In still another embodiment, the uncertainty can be estimated by observation of a projection of film 400 (with distortion compensation), e.g., by observing the residual differential distortions (in one or more theatres). The standard deviation of these residual differential distortions may be used as the uncertainty measure for the residual distortion.

This uncertainty can be used to generate a global lowpass filter, e.g. in the form of a single Gaussian convolution matrix, to be applied to an entire image. Alternatively, the uncertainty can vary across an image (i.e., different uncertainties in different parts of the image space), in which case, different blur functions (e.g., different Gaussian matrices) may be used in different regions and the results interpolated to obtain an appropriate blur function for use in another region, or a different blur function can also be provided for each pixel.

Step 609—Crosstalk Compensation

In step 609, the crosstalk values for a plurality of pixels in the projected images of the stereoscopic pair for one frame of the film or movie presentation, e.g., images 111 and 112 in FIG. 1, are determined (can be referred to as "pixel-wise" crosstalk value determination). In the context of crosstalk correction for a film, the use of the term "pixel" refers to that of a digital intermediate, i.e., a digitized version of the film, which, as one skilled in the art recognizes, is typically how film editing in post-production is done these days. Alternatively, the pixel can also be used in reference to the projected image space, e.g., corresponding to a location on the screen.

In one embodiment, it is assumed that crosstalk value determination and/or correction is desired or needed for all pixels in the left- and right-eye images. Thus, crosstalk values will be determined for all pixels in both the left- and right-eye images. In other situations, however, determination of the crosstalk values may be performed only for some pixels, e.g., if it is known or decided that crosstalk correction or compensation is not needed for certain pixels or portions of either of the images.

For a given pixel in a first-eye image under consideration, one or more pixels of the other-eye image that are projected proximate to the projection of the given pixel are identified, and the probable contribution from each of the proximate pixels (of the other-eye image) to the total expected crosstalk value of the given pixel is computed or determined. This is illustrated in FIG. 5, showing the left-eye pixel 510 (for which a crosstalk value is to be determined) and its proximate pixels, e.g., nine pixels 521-529 from the right-eye image that may contribute to the crosstalk value of pixel 510. Based on the lowpass filter determined in step 608 (generated based on the uncertainty in the residual differential distortion correction between a stereoscopic image pair), e.g., as in EQ. 1, the effective crosstalk contribution to a projected pixel of one eye image from the proximate pixels of the other eye image can be determined.

If the circular Gaussian blur (EQ. 1) is selected for the lowpass filter for modeling the uncertainty in the residual distortion, and the crosstalk percentage determined for the region around the pixel under consideration in step 604 or 607 is $X_T$ (crosstalk percentage), then the crosstalk value for the pixel under consideration is given by: $X_T$ times the sum of the products of the value of each proximate pixel in the other-eye image and the relative crosstalk contribution of each respective proximate pixel (the relative crosstalk contribution can be obtained by using a blur function such as EQ. 1).

For pixels of the left-eye, this crosstalk value can be calculated from the following equation.

$$\delta = |3\sigma_{i,j}| \qquad \text{EQ. 4}$$

$$X_{L_{i,j}} = X_{T_{i,j}} \sum_{x=-\delta}^{\delta} \sum_{y=-\delta}^{\delta} (V_{Ri+x,j+y} * G_{i,j}(x, y))$$

where $X_{L_{i,j}}$ is the expected crosstalk value at the left-eye pixel at $\{i,j\}$ due to crosstalk contributions from the significant or proximate right-eye pixels, when projected with differential distortion correction;

$X_{Ti,j}$ is the crosstalk percentage for a region of pixels at or near {i,j} in projected image space (can also be referred to as a local crosstalk);

$\sigma_{i,j}$ is the uncertainty (e.g., the standard deviation) of the residual differential distortion at or near {i,j}, which may vary across different regions of the screen;

$G_{i,j}$ is the circular Gaussian blur function of EQ. 1, using the σ appropriate to the region of pixels at or near {i,j}, i.e., $\sigma_{i,j}$, or some other function representative of the uncertainty; and, $V_{Ri,j}$ is the value (e.g., a vector value in a linear color space) of the pixel of right-eye image at {i,j}.

Essentially, EQ. 5 performs the convolution of the Gaussian blur function and the right-eye image (i.e., the other-eye image whose pixels contribute crosstalks to the left-eye image) to the appropriate extent, given the measure of uncertainty a, and results in the expected increased value, e.g., brightness, at a pixel of the left-eye image due to crosstalks from the right-eye image. The term $G_{i,j}(x,y)$ can be thought of as a weighting coefficient that represents a relative crosstalk contribution from a pixel having a value $V_{Ri+x, j+y}$ (the pixel in the "unblurred" right-eye image). The summation of the product of $V_{Ri+x,j+y}$ and $G_{i,j}(x,y)$ over the indicated ranges of x and y represents the application of the Gaussian blur to the unblurred right-eye image (or to the one or more pixels in the right-eye image proximate the left-eye image pixel $L_{i,j}$, when projected), and is also referred to as a lowpass-filtered value.

In this case, the distortion compensation transform should substantially correct for the differential distortions, i.e., aligning the pixels of the left- and right-eye images, except for any uncertainty associated with the residual distortion. Thus, the crosstalk contributions to the pixel of one eye's image arising from proximate pixels from the other eye's image will include a relative contribution of at most 1.0 from the aligned pixel (in the other eye's image) that corresponds to the given pixel under consideration, and contributions from the other proximate pixels will depend on the uncertainty in the residual distortion or distortion correction, which may be modeled by the Gaussian blur, or some other uncertainty function.

For example, if the uncertainty is less than or equal to ⅓ pixels, i.e., δ=3σ≤1.0, then there are nine other-eye (right-eye) pixels arranged in the 3×3 pixel square surrounding the pixel under consideration at {i,j}, as pixels 521-529 surround pixel 510, that are significant or proximate and included in the lowpass filter or Gaussian blur calculation.

In one embodiment, the expected crosstalk value $X_{Pi,j}$ (where P can be L or R, for the left- or right-eye images) is determined for each pixel (though not required in a general case) in each image. It is this crosstalk value for which compensation is needed for the left- or right-eye image pixel at {i,j}, in order to reduce the extra brightness that would otherwise be observed at the pixel due to crosstalk.

If the crosstalk percentage $X_T$ is determined only for one region of an image, e.g., no spatial variation is expected across the screen, then this quantity can be used in EQ. 4 for computing the crosstalk value for all pixels of that image.

If the crosstalk percentage determined in step 604 or 607 varies across the screen 140 (i.e., different measurements for different regions), then this variation is also taken into account in this step. For example, if the pixel under consideration is located between two regions with different crosstalk percentages, the value of $X_{Ti,j}$ may be obtained by interpolation. If the crosstalk percentage determined in step 604 or 607 varies with each of the cyan, yellow, and magenta print dyes, this variation can also be taken into account in this step, i.e., $X_T$ may be represented as a vector in a selected color space, or as separate crosstalk percentages for the respective print dye colors: $X_c$, $X_Y$, and $X_M$.

Note that for these computations, other-eye pixel values (e.g., $V_{Ri,j}$ for the right-eye) which refer to representations of one or more or a pixel's properties, e.g., brightness or luminance, and perhaps color, must be linear values. Thus, if the pixel values represent logarithmic values, they must first be converted into a linear representation before being manipulated in the above computation. The crosstalk value resulting from the scaled sum of products in EQ. 5 above may then be converted back into the logarithmic scale.

After the crosstalk value $X_{Pi,j}$ is computed, a crosstalk compensation for the pixel under consideration is performed. For example, a crosstalk compensation can be performed by subtracting the crosstalk value $X_{Pi,j}$ from the original value $V_{Pi,j}$ of the pixel (recall that P may be either L- or R-corresponding to the left- or right-eye image), again, in a linear (not logarithmic) representation. In subsequent step 610, these crosstalk-compensated pixels are used in the left- and right-eye images.

Steps 610-613

In step 610, the left- and right-eye images of the original 3D film (uncorrected for distortions) but with their respective crosstalk compensations from step 609, are transformed (i.e., warped) by applying a distortion compensation transform determined in step 608 and based on the distortion measurements previously obtained. The transformed images will include both crosstalk and distortion compensations, and they can be recorded to a film medium, e.g., film negative, if desired. Alternatively, the transformed images can also be recorded to a digital file, which can be used for generating a film at a later time.

These transformed images, which also include density changes (relative to the original 3D film) to compensate for crosstalks, can be recorded as distortion-corrected film, e.g., film 400. Note that step 608 establishes the distortion formula or transform, and the uncertainty associated with the residual distortion or corrected distortion; step 609 applies the crosstalk compensation formula (which may or may not be unique for each pixel), and step 610 applies the transform(s) from step 608 to all images of the film.

In step 611, one or more prints of the film may be made from the film recording made in step 610. Since the film recording made in step 610 is typically a negative, these prints made in step 611 would be made using typical film print production methods.

In an alternative embodiment, the film recording made in step 610 may be a film positive, suitable for direct display without printing step 611.

In some cases in which quick measurements or crude estimates are made (e.g., in step 604), and there may be substantial residual keystone or other distortions, a successive approximation can be made, in which the print made from step 611 is tested by returning (not shown in FIG. 6) to measurement step 604, but using the print from step 611 instead of the calibration film from step 603. In this case, incremental measurements are obtained and these can be added to the original compensation transform of step 608, or they can be the basis of a subsequent transform that is performed consecutively (e.g., a first transform might correct for keystoning, and a second transform correct for pin cushion distortion).

In optional step 612, the film print is distributed to the same theatre in which measurements were made, or other similar theatres or ones with similar projection systems. When properly adjusted, the presentation of the corrected film print should show little or no differential keystoning and pin cushion or barrel distortion (i.e., whatever distortions were measured and compensated for) and apparent crosstalk should be decreased, if not eliminated.

Process 600 concludes at step 613.

Figure 7A:
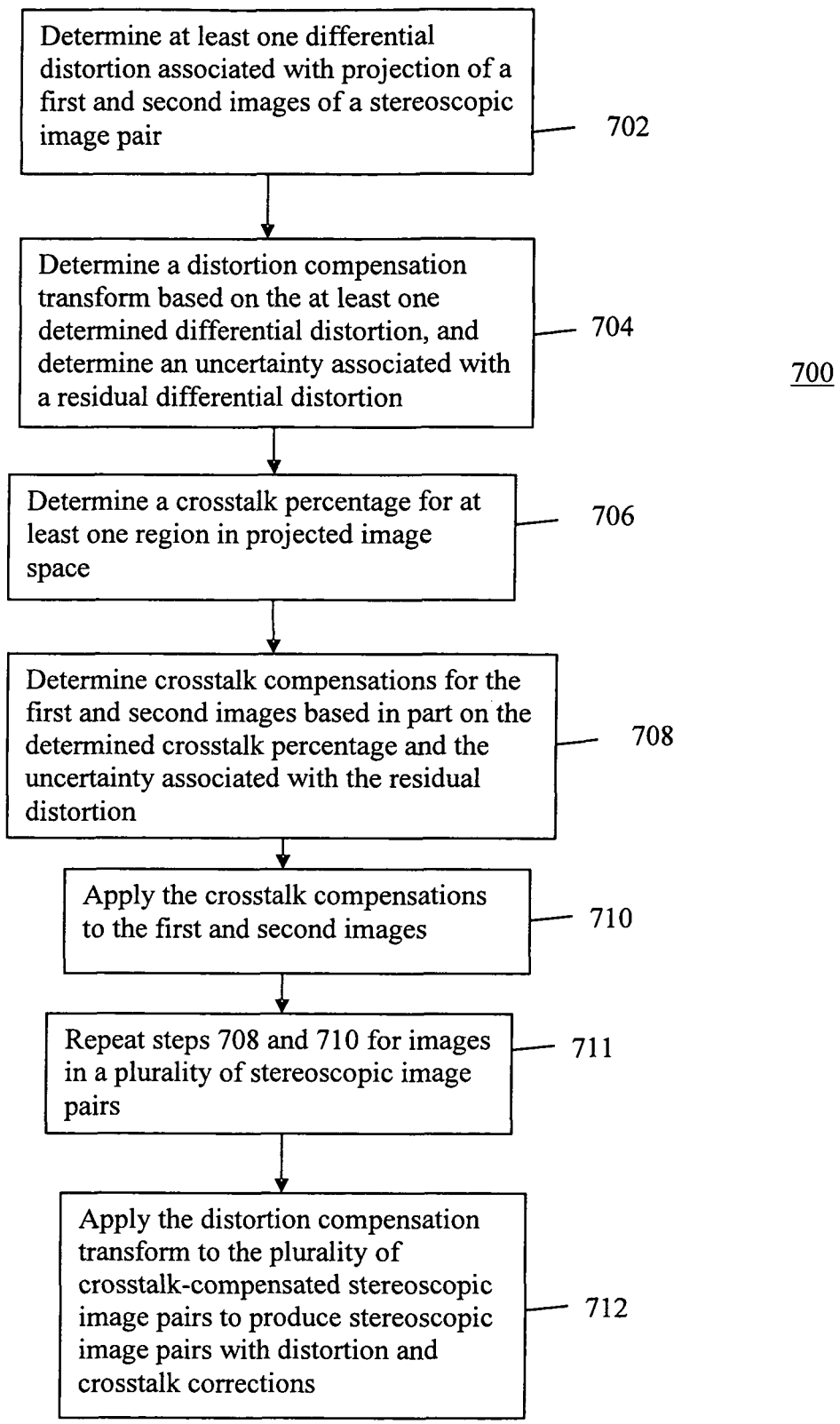
FIG. 7a illustrates another method to compensate for differential distortions and crosstalk in stereoscopic projection.

FIG. 7*a* illustrates another embodiment, a method 700, suitable for providing crosstalk and distortion corrections for a 3D or stereoscopic film or digital image file containing stereoscopic image pairs (e.g., forming a stereoscopic presentation) for projection using a dual-lens system. The digital image file can be a digital intermediate corresponding to the 3D film used in post-production, or it can be used directly for digital projection of the presentation.

In step 702, at least one differential distortion associated with projection of a first and second images of a stereoscopic image pair by a projection system or in a theatre is determined. Such a determination can be performed for one or more points or regions of one or both images of the stereoscopic pair, either by measurements or calculations, as previously discussed in connection with FIG. 6.

In step 704, a distortion compensation transform for correcting differential distortions for each stereoscopic image is determined based on the differential distortion(s) from step 702, and the uncertainty associated with a residual distortion (i.e., if the distortion compensation transform does not completely eliminate the differential distortion) is also determined, as previously discussed in step 608.

In step 706, an amount of crosstalk (expressed as a crosstalk percentage) for at least one location or region in projected image space or for the projected first and second images in a stereoscopic image pair are provided or determined. The crosstalk percentage(s) may be calculated or estimated as previously described, e.g., in connection with step 607 of method 600, or may be measured as described in steps 603-606. Note that the determination of differential distortion and compensation transform in steps 702 and 704 and the crosstalk percentage in step 706 can be performed in any order with respect to each other, as long as the distortion-related and crosstalk-related information are available for use in subsequent steps of the method 700.

In step 708, a crosstalk compensation for at least a first image of a stereoscopic image pair in the region of projected image space is determined based in part on the crosstalk percentage (from step 706) and the uncertainty associated with the residual distortion (from step 704). For example, the crosstalk compensation can be determined for the image by calculating crosstalk values for one or more pixels in the first image using the approach previously described in connection with step 609 of method 600.

For each of one or more pixels of the first image of the stereoscopic pair (i.e., at least those pixels for which crosstalk compensation is to be done), a crosstalk compensation can be obtained based on the crosstalk value calculated for the pixel in the first image using EQ. 4. The procedures for calculating the crosstalk value of the first image's pixel, based in part on the crosstalk percentage for the region around the pixel and values of one or more proximate pixels in the second image of the stereoscopic pair, have been described above in connection with method 600, e.g., step 609. Based on the crosstalk value of that pixel, a crosstalk compensation or correction can be expressed or implemented as a density or brightness adjustment to the pixel in the first image that would at least partially compensate for the effect of crosstalk contributions from proximate pixels from the second image of the image pair.

Similar procedures for determining crosstalk-related information can be performed for other pixels and other regions (e.g., if the crosstalk percentage varies with different regions in the projected image space) in the first image, as well as for pixels in the second image (to compensate for crosstalk contributions from pixels of the first image) of the stereoscopic pair.

In step 710, the crosstalk compensations determined for the first and second images in step 708 are applied to the respective images of the stereoscopic image pair. In step 711, steps 708 and 710 can be repeated for images in a plurality of stereoscopic image pairs in a 3D presentation, e.g., to the image pairs in all frames of the presentation. For example, the crosstalk compensation determined for the first image (e.g., left-eye image) of each stereoscopic pair is applied to the corresponding left-eye image in the 3D presentation, and the crosstalk compensation determined for each right-eye image is applied to the corresponding right-eye image in the 3D presentation.

In step 712, the distortion compensation transform (from step 704) is applied to the crosstalk-compensated image pairs, resulting in stereoscopic image pairs that have been compensated for both differential distortion and crosstalk.

In this embodiment, the crosstalk compensation is applied to the images prior to applying the distortion compensation transform, so that a one-to-one correspondence can be retained between the pixel of the first image (for which crosstalk is being calculated) and the pixel of the second image that contributes crosstalk to the first image.

These stereoscopic images can then be used for producing a film recording such as a film negative, or a digital image file, which can be used to produce the film negative (e.g., digital intermediate) or for use in digital presentation.

Figure 7B:
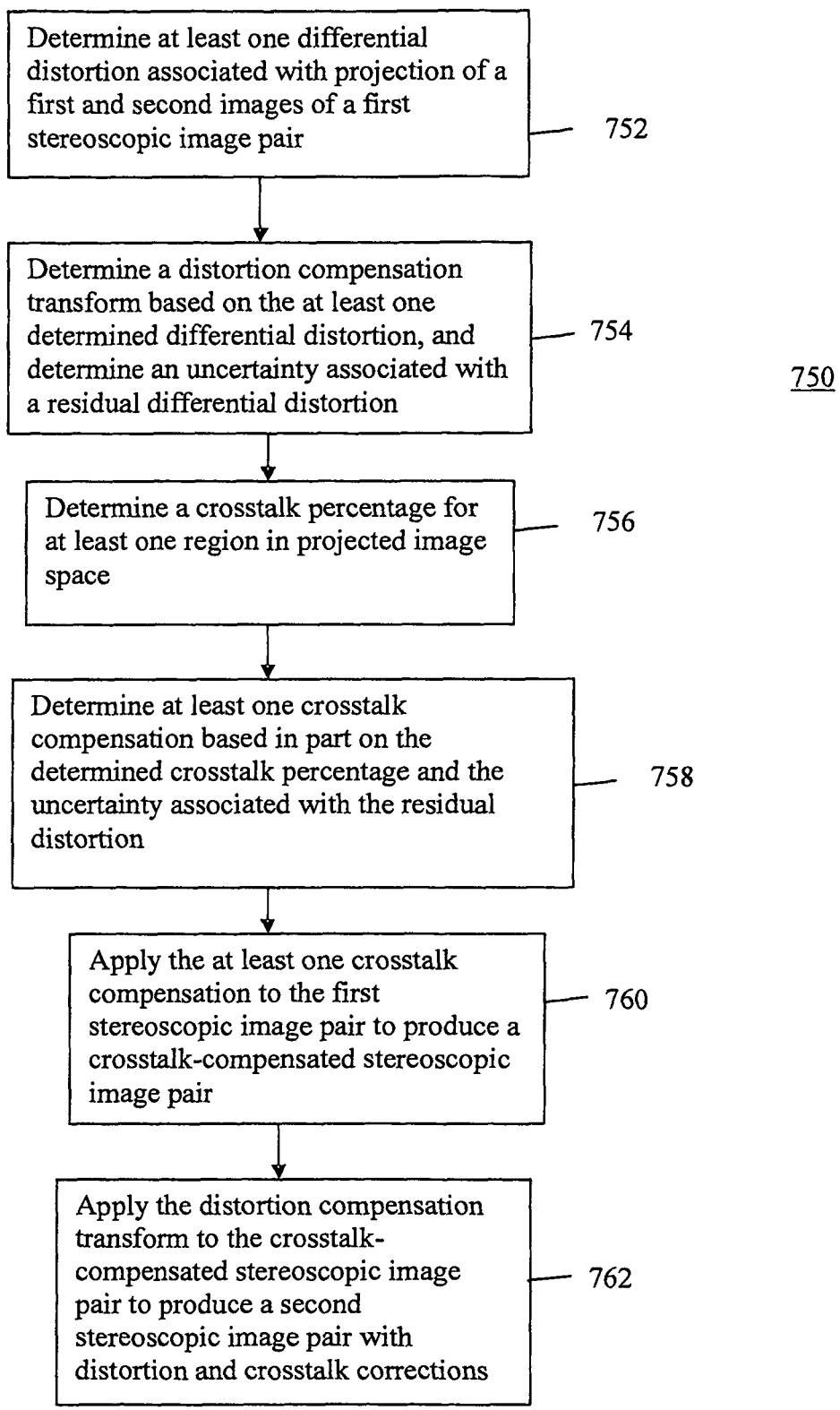

One or more steps in method 700 can also be modified or adapted for other embodiments. For example, a variation of method 700 is illustrated in FIG. 7*b*, which relates to a method 750 of providing crosstalk and differential distortion compensations to a single frame of film or a digital file, in which the single frame includes a left- and right-eye images of a stereoscopic pair.

In step 752, at least one differential distortion associated with projection of images of a first stereoscopic image pair is determined, e.g., using techniques and procedures previously described in connection with methods 700 and method 600. The first stereoscopic image pair is provided in a frame of a film or digital file, e.g., the left- and right-eye images such as [310, 311] from stereoscopic film 300 in FIG. 3*a*, which corresponds to images in an original film, without any distortion or crosstalk compensations.

In step 754, a distortion compensation transform is determined based on the differential distortion from step 752, and an uncertainty associated with a residual differential distortion is also determined. In step 756, a crosstalk percentage for at least one region in projected image space is determined. In step 758, at least one crosstalk compensation is determined, based in part on the crosstalk percentage from step 756 and the uncertainty determined in step 754. Procedures for performing steps 754, 756 and 758 are similar to those previously described, e.g., for methods 700 and 600.

In step 760, the at least one crosstalk compensation from step 758 is applied to the first stereoscopic image pair to produce a crosstalk-compensated stereoscopic image pair. Details relating to the crosstalk compensation have been discussed previously, e.g., in connection with methods 700 and 600. This crosstalk-compensated image pair incorporates brightness-related adjustments in one or more regions or pixels of the respective left- and right-eye images. These brightness-related adjustments can be implemented as density adjustments to a film negative or pixel brightness adjustment in a digital file. When the crosstalk-compensated images are projected, effects from crosstalk (e.g., extra brightness observed in one eye's image due to leakage from the other eye's image) would be at least partially, if not completely, compensated for.

In step 762, the distortion compensation transform (from step 754) is applied to the crosstalk-compensated stereoscopic pair to produce a second stereoscopic pair with both differential distortion and crosstalk compensations. Again, details relating to the distortion compensation transform have been previously described. The second stereoscopic image pair will resemble left- and right-eye images from the 3D film 400 in FIG. 4, e.g., images {410, 411} in which the warped images represent images with corrections for one or more differential distortions. When projected, these distortion-corrected images will result in left- and right-eye images in a stereoscopic pair substantially overlapping each other.

If desired, one or more steps in method 750 can be repeated for additional frames in a film or digital file, to produce a stereoscopic film or digital file that is compensated for crosstalk and differential distortion associated with one or more projection systems.

Although embodiments of the present invention have been illustrated with specific examples such as methods 600, 700 and 750, other embodiments can also omit one or more steps in these methods. For example, if certain distortion-related or crosstalk-related information is available or otherwise provided, the step of determining the information or parameters can be omitted. Thus, if information such as differential distortion, uncertainty, crosstalk percentage, is already available, such information can be used as a basis in other steps such as determining and/or applying differential distortion compensation or crosstalk compensation.

Aside from providing a method for crosstalk and differential distortion compensations for use in 3D projection or presentation, another aspect of the present principles also provides a film medium or digital image file containing a plurality of stereoscopic images that have been corrected for differential distortion and crosstalk associated with a projection system, such as a dual-lens single projector system. Images contained in such a film medium or digital image file can include a first and second sets of images, each image from one of the two sets of images forming a stereoscopic image pair with an associated image from the other of the two sets of images. In one embodiment, at least some images in the first and second sets of images incorporate compensations for differential distortion and crosstalk. In general, it is preferable that all images in the film medium or digital file are compensated for differential distortion and crosstalk. The crosstalk compensation for the images is determined based in part on an uncertainty associated with a residual differential distortion, which may be present in the projected stereoscopic images, e.g., if the differential distortion compensation is insufficient to completely eliminate or correct for the differential distortion.

The present invention may also be applied to synchronized dual film projectors (not shown), where one projector projects the left-eye images and the other projector projects the right-eye images, each through an ordinary projection lens (i.e., not a dual lens such as dual lens 130). In a dual projector embodiment, the inter-lens distance 150 would be substantially greater, and distortions can be substantially greater, since the projection lenses of each projector would be substantially farther apart than in dual lens 130.

Digital Projection System

While the above discussion and examples focuses on distortion correction for film-based 3D projection, the principles regarding distortion compensation and compensation for crosstalk contributions from one image to the other image of a stereoscopic pair are equally applicable to certain implementations of digital 3D projection. Thus, one or more features of the present principles for distortion and crosstalk compensations can also be applied to certain digital 3D projection systems that use separate lenses or optical components to project the right- and left-eye images of stereoscopic image pairs, in which differential distortions and crosstalks are likely to be present. Such systems may include single-projector or dual-projector systems, e.g., Christie 3D2P dual-projector system marketed by Christie Digital Systems USA, Inc., of Cypress, Calif., U.S.A., or Sony SRX-R220 4 K single-projector system with a dual lens 3D adaptor such as the LKRL-A002, both marketed by Sony Electronics, Inc. of San Diego, Calif., U.S.A. In the single projector system, different physical portions of a common imager are projected onto the screen by separate projection lenses.

For example, a digital projector may incorporate an imager upon which a first region is used for the right-eye images and a second region is used for the left-eye images. In such an embodiment, the display of the stereoscopic pair will suffer the same problems of differential distortions and crosstalk described above for film because of the different optical paths for the projection of respective stereoscopic images, and the physical or performance-related limitations of one or more components encountered by the projecting light.

In such an embodiment, a similar compensation is applied to the stereoscopic image pair. This compensation can be applied (e.g., by a server) to the respective image data either as it is prepared for distribution to a player that will play out to the projector, or by the player itself (in advance or in real-time), by real-time computation as the images are transmitted to the projector, by real-time computation in the projector itself, or in real-time in the imaging electronics, or a combination thereof. Carrying out these corrections computationally in the server or with real-time processing produces substantially the same results with substantially the same process as described above for film.

Figure 8:
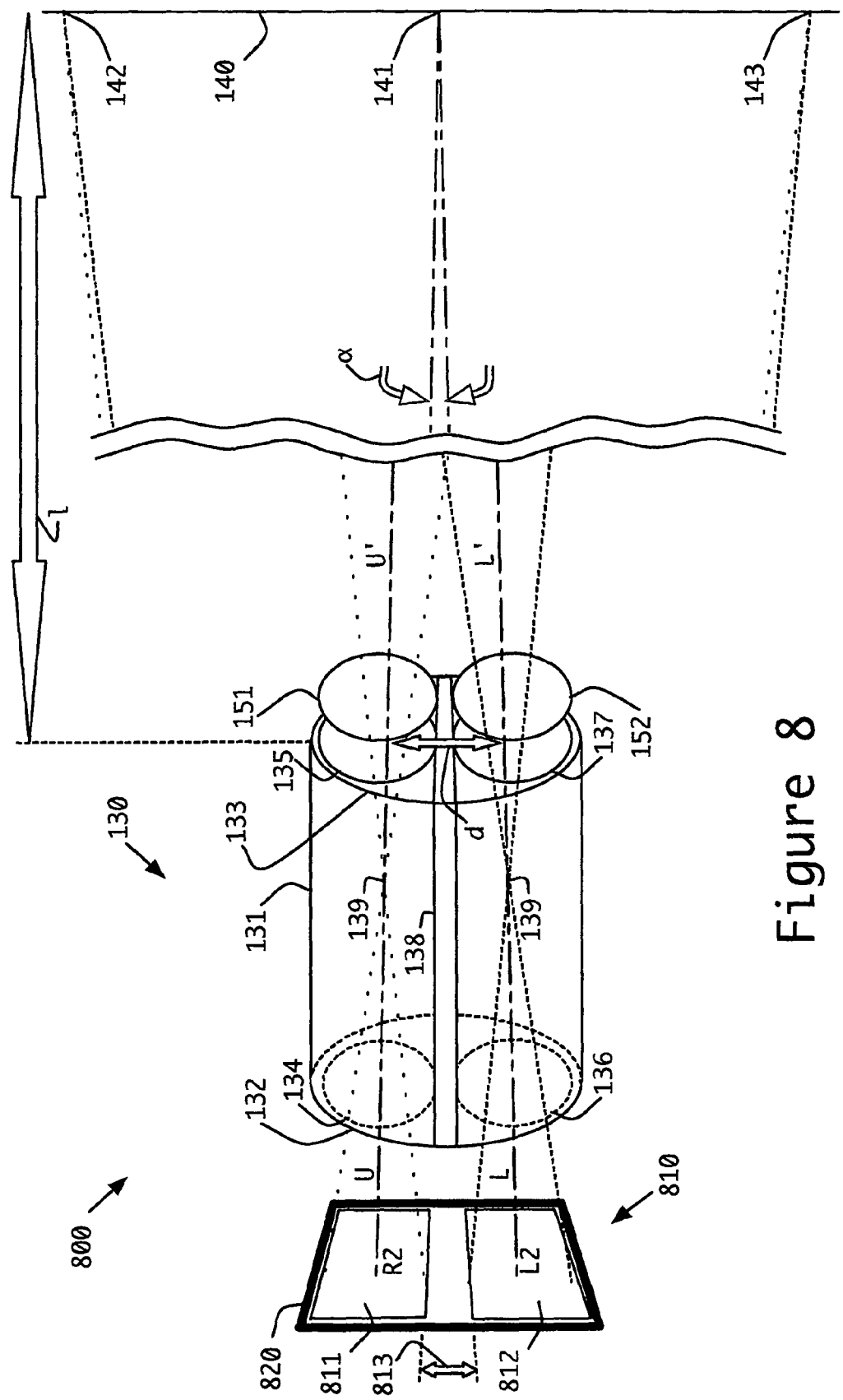
FIG. 8 illustrates a digital stereoscopic projector system.

An example of a digital projector system 800 is shown schematically in FIG. 8, which includes a digital projector 810 and a dual-lens assembly 130 such as that used in the film projector of FIG. 1. In this case, the system 800 is a single imager system, and only the imager 820 is shown (e.g., color wheel and illuminator are omitted). Other systems can have three imagers (one each for the primary colors red, green and blue), and would have combiners that superimpose them optically, which can be considered as having a single three-color imager, or three separate monochrome imagers. In this context, the word "imager" can be used as a general reference to deformable mirrors display (DMD), liquid crystal on silicon (LCOS), light emitting diode (LED) matrix display, and so on. In other words, it refers to a unit, component, assembly or sub-system on which the image is formed by electronics for projection. In most cases, the light source or illuminator is separate or different from the imager, but in some cases, the imager can be emissive (include the light source), e.g., LED matrix. Popular imager technologies include micro-mirror arrays, such as those produce by Texas Instruments of Dallas, Tex., and liquid crystal modulators, such as the liquid crystal on silicon (LCOS) imagers produced by Sony Electronics.

The imager 820 creates a dynamically alterable right-eye image 811 and a corresponding left-eye image 812. Similar to the configuration in FIG. 1, the right-eye image 811 is projected by the top portion of the lens assembly 130 with encoding filter 151, and the left-eye image 812 is projected by the bottom portion of the lens assembly 130 with encoding filter 152. A gap 813, which separates images 811 and 812, may be an unused portion of imager 820. The gap 813 may be considerably smaller than the corresponding gap (e.g., intra-frame gap 113 in FIG. 1) in a 3D film, since the imager 820 does not move or translate as a whole (unlike the physical advancement of a film print), but instead, remain stationary (except for tilting in different directions for mirrors in DMD), images 811 and 812 may be more stable.

Furthermore, since the lens or lens system 130 is less likely to be removed from the projector (e.g., as opposed to a film projector when film would be threaded or removed), there can be more precise alignment, including the use of a vane projecting from lens 130 toward imager 820 and coplanar with septum 138.

In this example, only one imager 820 is shown. Some color projectors have only a single imager with a color wheel or other dynamically switchable color filter (not shown) that spins in front of the single imager to allow it to dynamically display more than one color. While a red segment of the color wheel is between the imager and the lens, the imager modulates white light to display the red component of the image content. As the wheel or color filter progresses to green, the green component of the image content is displayed by the imager, and so on for each of the RGB primaries (red, green, blue) in the image.

FIG. 8 illustrates an imager that operates in a transmissive mode, i.e., light from an illuminator (not shown) passes through the imager as it would through a film. However, many popular imagers operate in a reflective mode, and light from the illuminator impinges on the front of the imager and is reflected off of the imager. In some cases (e.g., many micro-mirror arrays) this reflection is off-axis, that is, other than perpendicular to the plane of the imager, and in other cases (e.g., most liquid crystal based imagers), the axis of illumination and reflected light are substantially perpendicular to the plane of the imager.

In most non-transmissive embodiments, additional folding optics, relay lenses, beamsplitters, and other components (omitted in FIG. 8, for clarity) are needed to allow imager 820 to receive illumination and for lens 130 to be able to project images 811 and 812 onto screen 140.

To compensate for crosstalk and distortions in digital projection systems, one can follow most of the method steps previously described in connection with FIG. 6 and FIG. 7, except for those that are specifically directed to film prints. For example, in the case of a digital image file for 3D projection, instead of a calibration film, a calibration image will be projected from an image file. Thus, for a pixel of a first image of a stereoscopic pair, in order to compensate for crosstalk contribution from the other image of the stereoscopic pair, density adjustment or modification would involve decreasing the brightness of that pixel by an amount about equal to crosstalk contribution (i.e., brightness increase) from the other image.

Although various aspects of the present invention have been discussed or illustrated in specific examples, it is understood that one or more features used in the invention can also be adapted for use in different combinations in various projection systems for film-based or digital 3D presentations. Thus, other embodiments applicable to both film-based and digital projection systems may involve variations of one or more method steps shown in FIG. 6 and FIG. 7. For example, method 300 and method 600 include steps for determining differential or geometric distortion and crosstalk for left- and right-eye images projected on a screen. These steps may be modified under certain circumstances.

In one example, if there is prior knowledge (e.g., from computation, estimates or otherwise available or provided) regarding the distortion associated with one of the projected stereoscopic images, then a distortion measurement for the other image would be sufficient to allow an appropriate compensation for the differential distortion to be determined (e.g., without necessarily projecting both images on screen for distortion measurements or determination). Of course, the distortion measurement for the other image has to be made with respect to the known distortion of the first image in order for it to be useful towards compensating for the differential distortion. Such prior knowledge may be obtained from experience, or may be computed based on certain parameters of the projection system, e.g., throw distance, inter-axial distance, among others. However, in the absence of such prior knowledge, measurements on both stereoscopic images would generally be needed in order to arrive at the differential distortion.

Similarly, if prior knowledge exists for the crosstalk, (e.g., from computation, estimates or otherwise available or provided) then determination of the crosstalk may also be omitted. Instead, the available crosstalk information can be used, in conjunction with the distortion information, for providing crosstalk compensation. If, however, as in steps 604 and 704, crosstalk is to be measured, a suitable, corresponding projection for a digital or video projector can use an all-white test pattern or an image containing a white field.

While the forgoing is directed to various embodiments of the present invention, other embodiments of the invention may be devised without departing from the basic scope thereof. Thus, the appropriate scope of the invention is to be determined according to the claims that follow.

What is claimed is:

1. A method for providing crosstalk and differential distortion compensations for a plurality of stereoscopic image pairs for use with a stereoscopic projection system, comprising:
    (a) determining a distortion compensation transform based on at least one differential distortion associated with projection of a first and second images of a stereoscopic image pair;
    (b) applying crosstalk compensation to the plurality of stereoscopic image pairs in accordance with an uncertainty associated with a residual differential distortion, and a crosstalk percentage for a region in projected image space; and
    (c) applying the distortion compensation transform to the plurality of crosstalk-compensated stereoscopic image pairs to produce a stereoscopic presentation containing the plurality of crosstalk-compensated image pairs with differential distortion corrections.

2. The method of claim 1, wherein step (a) further comprises:
    determining the at least one differential distortion by performing at least one of measurement, estimation and calculation.

3. The method of claim 1, further comprising:
    determining a crosstalk value for at least one pixel in the first image of the stereoscopic pair based in part on the crosstalk percentage; and
    determining the crosstalk compensation based on the crosstalk value for the at least one pixel.

4. The method of claim 3, wherein the determining of the crosstalk value further comprises applying a blur function to the second image of the stereoscopic pair.

5. The method of claim 4, wherein the uncertainty associated with the residual differential distortion is a parameter in the blur function.

6. The method of claim 5, wherein the blur function is a Gaussian function.

7. The method of claim 1, wherein step (b) further comprises determining the crosstalk percentage for the region in projected image space by at least one of measurement and calculation.

8. The method of claim 1, wherein the plurality of stereoscopic image pairs are provided in one of a film and digital image file.

9. A method for providing crosstalk and differential distortion compensations in stereoscopic image pairs for use with a stereoscopic projection system, comprising:
 (a) determining a distortion compensation transform based on at least one differential distortion associated with projection of a first and second images of a first stereoscopic image pair;
 (b) applying at least one crosstalk compensation to the first stereoscopic image pair in accordance with an uncertainty associated with a residual differential distortion, and a crosstalk percentage for a region in projected image space; and
 (c) applying the distortion compensation transform to the first crosstalk-compensated stereoscopic image pair to produce a second stereoscopic image pair with crosstalk and differential distortion corrections.

10. The method of claim 9, further step (a) further comprises:
 determining the at least one differential distortion by performing at least one of measurement, estimation and calculation.

11. The method of claim 9, further comprising:
 determining a crosstalk value for at least one pixel in the first image of the first stereoscopic pair based in part on the crosstalk percentage determined in step (d); and
 determining the at least one crosstalk compensation based on the crosstalk value for the at least one pixel.

12. The method of claim 11, wherein the determining of the crosstalk value further comprises applying a blur function to the second image of the first stereoscopic pair.

13. The method of claim 12, wherein the uncertainty associated with a residual differential distortion is a parameter in the blur function.

14. The method of claim 13, wherein the blur function is a Gaussian function.

15. The method of claim 9, wherein step (b) further comprises determining the crosstalk percentage for the region in projected image space by at least one of measurement and calculation.

16. A plurality of stereoscopic images recorded on one of a film medium or a digital image file, for use in a stereoscopic projection system, comprising:
 a first set of images and a second set of images, each image from one of the two sets of images forming a stereoscopic image pair with an associated image from the other of the two sets of images;
 wherein at least some images in the first and second sets of images incorporate compensations for differential distortion and crosstalk, and the crosstalk compensation is determined based in part on an uncertainty associated with a residual differential distortion.

17. The plurality of images of claim 16, wherein the compensation for the crosstalk includes brightness adjustments to at least one region of the first set of images.

18. The plurality of images of claim 17, wherein the crosstalk compensation is determined from at least a crosstalk value of a pixel in an image from the first set of images, and the crosstalk value is derived from a crosstalk percentage in the at least one region around the pixel and crosstalk contributions from an image belonging to the second set of images.

19. The plurality of images of claim 18, wherein the crosstalk contributions from the image belonging to the second set of images are determined using a blur function.

20. The plurality of images of claim 19, wherein the blur function is a Gaussian function.

21. A system comprising:
 a server configured for performing a method of providing crosstalk and differential distortion compensations for a plurality of stereoscopic image pairs, the method comprising:
 (a) determining a distortion compensation transform based on at least one differential distortion associated with projection of a first and second images of a stereoscopic image pair;
 (b) applying crosstalk compensation to the plurality of stereoscopic image pairs in accordance with an uncertainty associated with a residual differential distortion, and a crosstalk percentage for a region in projected image space; and
 (c) applying the distortion compensation transform to the plurality of crosstalk-compensated stereoscopic image pairs to produce a stereoscopic presentation containing the plurality of crosstalk-compensated image pairs with differential distortion corrections; and
 a digital projector configured for projecting the stereoscopic presentation.

22. The system of claim 21, wherein step (a) of the method further comprises:
 determining the at least one differential distortion by performing at least one of measurement, estimation and calculation.

23. The system of claim 21, wherein the server is further configured for:
 determining a crosstalk value for at least one pixel in the first image of the stereoscopic pair based in part on the crosstalk percentage; and
 determining the crosstalk compensation based on the crosstalk value for the at least one pixel.

* * * * *